US008635196B2

(12) United States Patent
Rosenblatt

(10) Patent No.: US 8,635,196 B2
(45) Date of Patent: Jan. 21, 2014

(54) SYSTEMS AND METHODS FOR PROVIDING PRE-POPULATED MEDIA DEVICES

(75) Inventor: Michael Rosenblatt, Campbell, CA (US)

(73) Assignee: Apple Inc., Cupertino, CA (US)

(*) Notice: Subject to any disclaimer, the term of this patent is extended or adjusted under 35 U.S.C. 154(b) by 478 days.

(21) Appl. No.: 12/242,896

(22) Filed: Sep. 30, 2008

(65) Prior Publication Data

US 2009/0177699 A1 Jul. 9, 2009

Related U.S. Application Data

(60) Provisional application No. 61/010,024, filed on Jan. 4, 2008.

(51) Int. Cl.
G06F 7/00 (2006.01)
G06F 17/00 (2006.01)
G06F 17/30 (2006.01)

(52) U.S. Cl.
USPC .......................................... 707/694; 707/758

(58) Field of Classification Search
USPC .................................. 707/999.003, 694, 758
See application file for complete search history.

(56) References Cited

U.S. PATENT DOCUMENTS

| 2003/0079038 | A1 | 4/2003 | Robbin et al. |
| 2003/0167318 | A1 | 9/2003 | Robbin et al. |
| 2004/0133550 | A1* | 7/2004 | Okamura ........................ 707/1 |
| 2005/0021478 | A1 | 1/2005 | Gautier et al. |
| 2005/0050345 | A1 | 3/2005 | Dowdy et al. |
| 2006/0089949 | A1 | 4/2006 | Robbin et al. |
| 2006/0107822 | A1 | 5/2006 | Bowen |
| 2006/0168351 | A1 | 7/2006 | Ng et al. |
| 2006/0200413 | A1* | 9/2006 | Kessel et al. .................... 705/50 |
| 2006/0265409 | A1 | 11/2006 | Neumann et al. |
| 2007/0033402 | A1* | 2/2007 | Williams et al. .............. 713/169 |
| 2007/0073728 | A1* | 3/2007 | Klein et al. ..................... 707/10 |
| 2007/0169087 | A1 | 7/2007 | Fadell |
| 2007/0282848 | A1* | 12/2007 | Kiilerich et al. ................ 707/10 |
| 2008/0113614 | A1 | 5/2008 | Rosenblatt |

* cited by examiner

Primary Examiner — Alexey Shmatov
(74) Attorney, Agent, or Firm — Novak Druce Connolly Bove + Quigg LLP

(57) ABSTRACT

Methods and systems are provided for obtaining and using media devices that are pre-populated with media items of interest. In some embodiments, a user can select a media device and one or more media items. Subsequently, the selected media device may be pre-populated by saving metadata files, sample media item files, and/or media item files associated with the one or more selected media items on the selected media device.

10 Claims, 19 Drawing Sheets

SYSTEMS AND METHODS FOR PROVIDING PRE-POPULATED MEDIA DEVICES

CROSS-REFERENCE TO RELATED APPLICATION

This claims the benefit of U.S. Provisional Patent Application No. 61/010,024, filed Jan. 4, 2008, which is hereby incorporated by reference herein in its entirety.

FIELD OF THE INVENTION

This can relate to systems and methods for providing pre-populated media devices.

BACKGROUND OF THE DISCLOSURE

Conventionally, the most common way to purchase electronic media devices (e.g., compact disc players and video cassette players) and the particular media items to be used therewith (e.g., music and movies) has been to purchase these commodities in a physical store. Recently, consumers have been given the option of purchasing via the Internet certain types of electronic media devices that are then physically shipped to the appropriate address. Even more recently, consumers have been given the option of purchasing via the Internet certain types of media items as well. Numerous centralized servers exist with media items that are available for download directly by the user. Peer-to-peer sharing systems also allow users to download media items from other users.

Unfortunately, consumers cannot currently purchase media players, either in a physical store or via the Internet, that already include media items of interest to the user. Instead, a consumer may generally have to obtain media items of interest and then subsequently transfer them to a media device. This process can be time-consuming and inefficient. Accordingly, what is needed are systems and methods for providing media devices that are pre-populated with media items of interest.

SUMMARY OF THE DISCLOSURE

Systems and methods for obtaining and using media devices that are pre-populated with media items of interest are provided.

According to one embodiment, a method for utilizing a pre-populated media device includes receiving a user request for a media item, wherein the media item is associated with a metadata file, retrieving a media item file associated with the metadata file, and presenting the media item file to the user.

According to one embodiment, a method for utilizing a pre-populated media device includes receiving a user request for a media item, wherein the media item is associated with a sample media item file, verifying user authorization for accessing the sample media item file, and presenting the sample media item file to the user.

According to one embodiment, a method for utilizing a pre-populated media device includes receiving a synchronization request, wherein the synchronization request is associated with a media item file, copying the media item file from the media device to a client device, and removing the media item file from the media device.

According to one embodiment, a method for utilizing a pre-populated media device includes receiving a synchronization request, wherein the synchronization request is associated with a media item file, and wherein the media item file is associated with metadata information saved on the media device. The method also includes verifying user authorization for accessing the media item file, and updating the metadata information on the media device after copying the media item file from the media device to a client device.

According to one embodiment, a method for utilizing a pre-populated media device includes receiving a user request for at least one related media item, wherein the user request is associated with a media item file, retrieving the at least one related media item, and presenting the at least one related media item to the user.

According to one embodiment, a method for producing a pre-populated media device includes receiving a user selection of at least one media item, receiving a user selection of a media device, and saving the at least one media item on the media device.

BRIEF DESCRIPTION OF THE DRAWINGS

The above and other features of the invention, its nature and various advantages will be more apparent upon consideration of the following detailed description, taken in conjunction with the accompanying drawings, in which like reference characters refer to like parts throughout, and in which.

DETAILED DESCRIPTION OF THE DISCLOSURE

Figure 1:
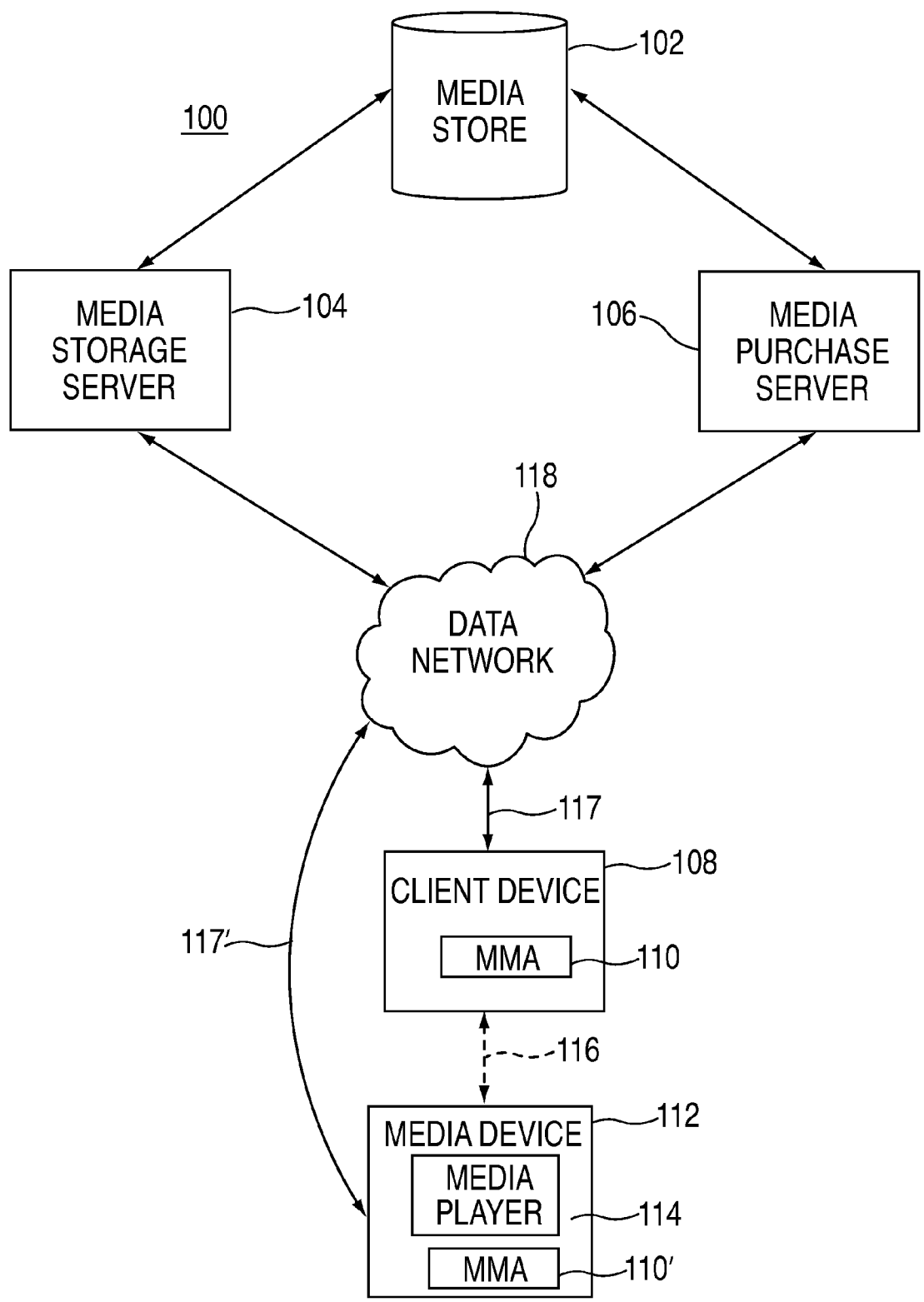
FIG. 1 is an illustrative media system in accordance with embodiments of the invention.

In view of the foregoing, systems and methods for obtaining and using media devices that are pre-populated with media items of interest are provided.

Media devices that may be pre-populated with media items of interest before the devices are made accessible to a user are provided. In the context of the invention, a media item may be a media resource including, but not limited to, audio, video, text, graphics, and/or multimedia resources. A media asset may define a group of disparate media resources. Examples of media assets may include groups of audio files, video files, podcast files, any other group of media resources, or a combination thereof.

Related media items may be media items that share a common theme. Examples of related media items may include the video files of the episodes of a program series or the video files of a preview of a movie and the movie itself. Another example of related media items may be different audio files that contain the music of the same artist.

In some embodiments, a user may purchase a media device that is pre-populated with selected media items of interest and/or information related to selected media items of interest. In some embodiments, a system may first receive a user selection of one or more media items and then receive a user selection of a media device. The system may then store the selected media items on the selected media device, and thereafter make the media device available to the user. In other embodiments, a system may first receive a user selection of a media device and then receive a user selection of one or more media items. The system may then store the selected media items on the selected media device, and thereafter make the media device available to the user. In both embodiments, instead of or in addition to the selected media items, the system may store metadata files, sample media item files, and/or media item files associated with the one or more selected media items on the selected media device before providing the device to the user.

After a user has acquired a pre-populated media device, the user may interact with the media device in various ways. A user interaction may include a request for a media item, a synchronization request, or a request for one or more related media items.

In some embodiments, a system may receive a user request for a particular media item. If the requested media item is associated with a media item file of the device, the media device may present the media item to the user. If the media item associated with the request is a metadata file of the device, the system may first determine whether the user is authorized to receive the media item. If the user is authorized, or if the user purchases the media item, the system may retrieve the media item from a media store or from the device itself, and may present it to the user.

If the user requests a media item that is associated with a sample media item file, a system may determine whether the user is allowed to access the sample media item file. If the user is permitted to access the sample media item file, the media device may present the sample media item file to the user. In other embodiments, the system may receive a user request to synchronize the media device with a client device by transferring a media item file from the media device to the client device. In response to receiving a synchronization request, the system may determine whether the synchronization is permitted. The system may first ensure that the media item is allowed to be copied from the media device. The system may then ensure that the client device is permitted to receive the media item, and that the media item has not already been saved on the client device.

After a system determines that a synchronization is permitted, the system may copy the media item file and any corresponding metadata files from the media device to the client device. After copying the media item file, the system may remove the media item file and any corresponding metadata files from the media device, or the system may replace the metadata information on the media device, for example.

In some embodiments, a system may receive a user request for other media items that are related to a particular media item. The system may first identify the related media item(s) that are available in a media store, and may present information regarding the related media item(s) to the user. The system may subsequently receive a user selection and a purchase request for one or more related media items, and may save the one or more related media items on a media device.

In view of the foregoing, systems and methods for obtaining and using media devices that are pre-populated with media items of interest are provided and described with reference to FIGS. 1-13.

FIG. 1 shows a media system 100 in accordance with embodiments of the invention. Media system 100 may include media store 102, media storage server 104, media purchase server 106, client device 108, media device 112, and data network 118. Media system 100 may also include other media servers and devices.

Media store 102 may store a plurality of media items that are available to a user through media system 100. The media items stored in media store 102 may include various types of media items, including, but not limited to, audio item files, video item files, text item files, graphics item files, various multimedia item files, combinations thereof, and the like. An example of a media store is the iTunes™ Store made available by Apple Inc. of Cupertino, Calif. Media storage server 104 can be any remote server that allows a user to access the media items stored in media store 102. Media storage server 104 may transfer media items from media store 102 to a client device (e.g., client device 108).

Media system 100 may also include media purchase server 106. Media purchase server 106 may permit a user to browse through and review media items stored in media store 102. Media purchase server 106 may also receive the payment for a media item stored in media store 102. Once purchased, media items can be acquired from media store 102 via media storage server 104. It will be understood by one skilled in the art that although media storage server 104 and media purchase server 106 are shown as two separate entities, other configurations are possible in other embodiments.

Media system 100 can typically include one or more client devices, such as client device 108. Client device 108 may be coupled to data network 118 so as to access media items in media store 102. Client device 108 may be a personal computer or any other suitable device. Client device 108 may also be coupled to media device 112. Client device 108 may access media items stored in media device 112 via communications link 116. Media device 112 may access media items stored in client device 108 via communications link 116.

Client device 108 may include media management application ("MMA") 110. An example of a media management application is the iTunes™ client application made available by Apple Inc. MMA 110 may be used to at least browse, search, acquire, and/or purchase media items from media store 102. MMA 110 may also be used to present media items to a user (e.g., play a video file). MMA 110 may additionally be used to create media assets (e.g., playlists of audio files), and to transfer media items from client device 108 to other client devices. MMA 110 may also synchronize client device 108 with media device 112 (or any other media devices) by transferring media item files between client device 108 and the media devices.

Media system 100 may include one or more media devices, such as media device 112. Media device 112 may be any suitable device that can present media items to a user. Media device 112 can be any device that is capable of presenting media items including, but not limited to, a portable media player, an audiobook, an audio player, a video player, a video recorder, a camera, an image viewer, a game player, a cellular telephone, a computer, a stereo system, a personal organizer, a hybrid of such devices, or combinations thereof. Media device 112 may perform a single function (e.g., a device that plays music, such as an iPod™ made available by Apple Inc.). Media device 112 may also perform multiple functions (e.g., a device that plays music, displays video, stores pictures, and receives and transmits telephone calls, such as an iPhone™ made available by Apple Inc.).

Media device 112 may include media player 114. Media player 114 may be any suitable application for presenting media items. Depending on the media item, media player 114 may produce a visual presentation, an audio presentation, any other suitable presentation, or a combination thereof. As an example, media player 114 may produce an audio presentation of an audio file. As another example, media player 114 may generate both a visual and audio presentation of a video file.

Media device 112 may be coupled with client device 108 or any other device via communications link 116 using any suitable approach. As an example, communications link 116 may be any suitable wireless connection. The communications link may support any suitable wireless protocol such as, for example, Wi-Fi (e.g., a 802.11 protocol), Bluetooth™, infrared, GSM, GSM plus EDGE, CDMA, quadband, WiMax (e.g., a 802.16 protocol), Ultra-Wide Band, or any other suitable wireless protocol. Alternatively, communications link 116 may be a wired link that is coupled to both media device 112 and the other device (e.g., a wire with a USB connector or a 30-pin connector). A combination of links may also be used to couple media device 112 with another device.

It will be understood by one skilled in the art that although client device 108 and media device 112 are shown as two separate entities, other configurations are possible in other embodiments. For example, in some embodiments, media device 112 itself may include a media management application 110', similar to MMA 110, such as iTunes™. Media device 112 itself may use MMA 110' to at least browse, search, acquire, and/or purchase media items from media store 102 similarly to MMA 110. MMA 110' may also be used to present media items to a user (e.g., play a video file) in conjunction with or as an alternative to media player 114. MMA 110' may additionally be used to create media assets (e.g., playlists of audio files), and to transfer media items from media device 112 to client device 108 or other devices. MMA 110' may also synchronize media device 112 with any other media devices by transferring media item files between them.

Data network 118 may be any suitable network through which MMA 110 of client device 108 (via communications link 117) and/or MMA 110' of media device 110' (via communications link 117') can access the media items in media store 102. In some embodiments, data network 118 may be a wired network such as the Internet, Ethernet, gigabit Ethernet, and fiber optic. In other embodiments, data network 118 may be a wireless network such as Wi-Fi (e.g., a 802.11 protocol), Bluetooth™, infrared, GSM, GSM plus EDGE, CDMA, quadband, WiMax (e.g., a 802.16 protocol), Ultra-Wide Band, or any other suitable wireless protocol. Any other suitable network, or a combination of the above identified networks, may be included in data network 118. Data network 118 may also include secure connections, such as Secure Sockets Layer (SSL).

Additional details on media purchasing systems and media synchronizing systems are provided in U.S. Patent Publication No. 2005/0021478, U.S. Patent Publication No. 2006/0089949, U.S. Patent Publication No. 2007/0169087, U.S. Patent Publication No. 2006/0107822, U.S. Patent Publication No. 2006/0265409, U.S. Patent Publication No. 2006/0168351, U.S. Patent Publication No. 2003/0167318, U.S. Patent Publication No. 2003/0079038, and U.S. Patent Publication No. 2008/0113614, each of which is hereby incorporated by reference herein in its entirety.

Figure 2:
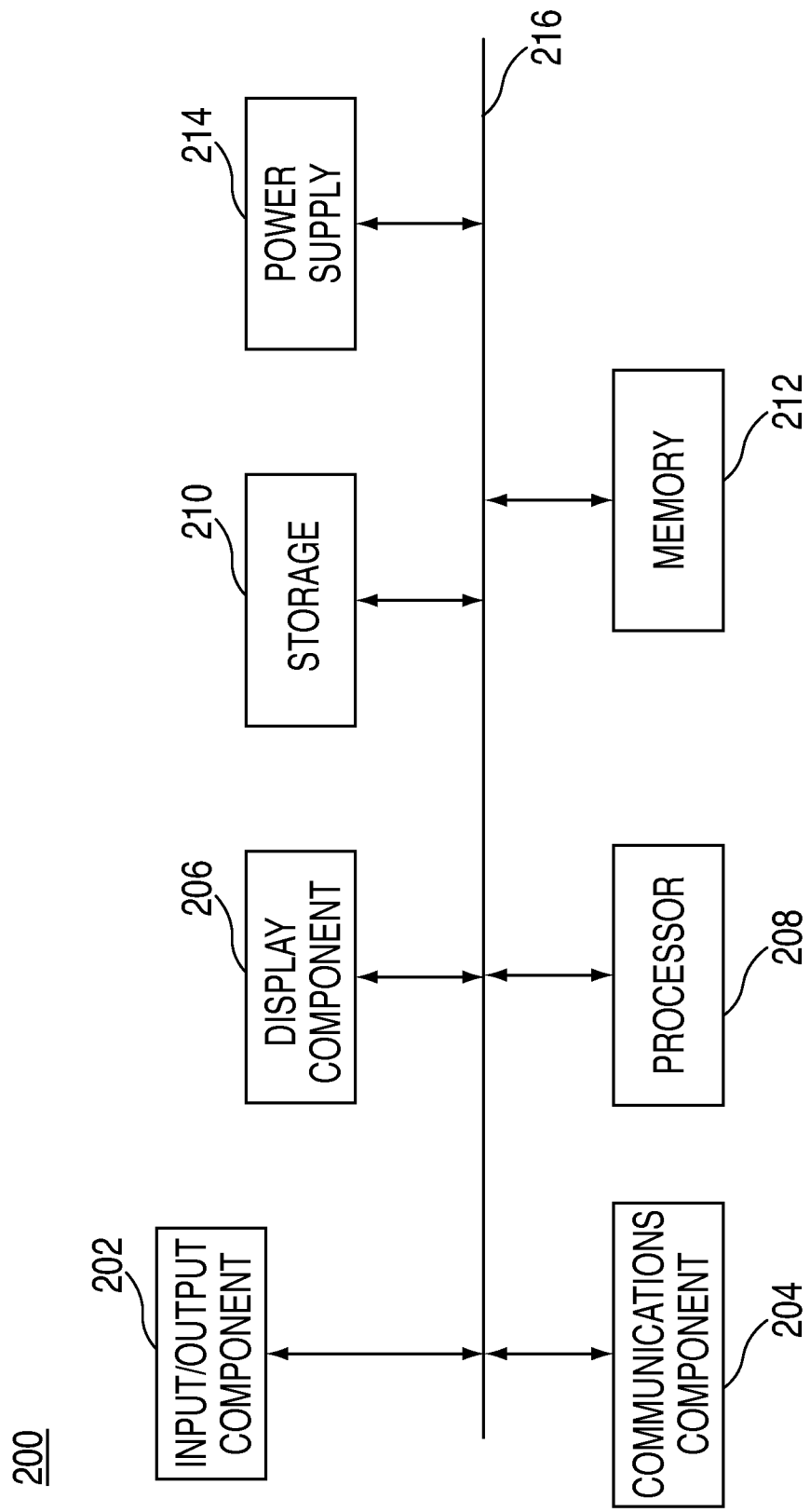
FIG. 2 is an illustrative block diagram of an electronic media device in accordance with embodiments of the invention.

FIG. 2 illustrates a simplified schematic diagram of components that can be implemented in a media device, such as media device 112 discussed above in connection with FIG. 1. Media device 200 of FIG. 2 can include input/output component 202, communications component 204, display component 206, control processor 208, storage 210, memory 212, power supply 214, and bus 216. Persons skilled in the art will appreciate that, in some embodiments, media device 200 can include more than one of each component, and that to avoid over-complicating the drawing, only one of each is shown in FIG. 2. In addition, persons skilled in the art will appreciate that the functionality of certain components can be combined or omitted and that additional components, which are not shown in FIG. 2, can be included in media device 200.

Input/output component 202 can convert (and encode/decode, if necessary) analog signals and other signals such as physical contact inputs (e.g., from a multi-touch screen), physical movements (e.g., from a click wheel), analog audio signals, etc., into digital data. Input/output circuitry 202 can convert digital data into analog signals and other signals (e.g., analog audio signals and analog video signals). The digital data can be provided to input/output component 202 by processor 208, memory 212, storage 210, or any other component of media device 200.

Although input/output component 202 is shown in FIG. 2 as a single component of media device 200, a plurality of input/output components can be included in media device 200. Input/output component 202 can be used to interface with any input or output components or circuitry. As an example, media device 200 can include specialized input circuitry associated with input components, such as a click wheel. As another example, media device 200 can include output circuitry associated with output components such as, for example, one or more audio speakers.

Communications component 204 can permit media device 200 to communicate with other servers or other devices using any suitable communications protocol. For example, communications component 204 may support Wi-Fi (e.g., a 802.11 protocol), Ethernet, Bluetooth™ (which is a trademark owned by Bluetooth Sig, Inc.), high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, WiMax (e.g., a 802.16 protocol), Ultra-Wide Band, any other communications protocol, or any combination thereof.

Display component 206 may be configured to present any of the display interfaces discussed below in connection with FIGS. 8-13. Display component 206 can accept and/or generate signals for presenting media information (e.g., textual and/or graphical information) on a display such as those discussed herein. For example, display component 206 can include a coder/decoder ("CODEC") to convert digital media data into analog signals. Display component 206 also can include display driver circuitry and/or circuitry for driving display driver(s). The display signals can be generated by processor 208 or display component 206. The display signals can provide media information related to media data received from communications component 204 and/or any other component of media device 200. In some embodiments, display component 206, like any other component discussed herein, can be integrated into and/or electrically coupled to media device 200.

Processor 208 can be configured to perform any function that media device 200 may be required to perform. For example, processor 208 may execute any of the steps in one or more of the processes discussed below in reference to FIGS. 3-7. Processor 208 may also be used to run operating system applications, firmware applications, media playback applications, media editing applications, and/or any other application.

Storage 210 can be, for example, one or more storage mediums, including for example, a hard-drive, flash memory, permanent memory such as ROM, any other suitable type of storage component, or any combination thereof. Storage 210 may store, for example, media item files (e.g., metadata files, sample media item files, or media item files), application data (e.g., for implementing functions on device 200), firmware, wireless connection information data (e.g., information that may enable media device 200 to establish a wireless connection), subscription information data (e.g., information that keeps track of podcasts or other media a user subscribes to), contact information data (e.g., telephone numbers and email addresses of a user), calendar information data, any other suitable data, or any combination thereof. The data may be formatted and organized in one or more types of data files.

Memory 212 can include cache memory, semi-permanent memory such as RAM, and/or one or more different types of memory used for temporarily storing media data. Memory 212 can also be used for storing data used to operate media device applications.

Power supply 214 can provide power to the components of media device 200. In some embodiments, power supply 214 can be coupled to a power grid (e.g., a wall outlet, automobile cigarette lighter, etc.). In some embodiments, power supply 214 can include one or more batteries for providing power to a portable media device. As another example, power supply 214 can be configured to generate power in a portable media device from a natural source (e.g., solar power using solar cells).

Bus 216 can provide a data transfer path for transferring data to, from, or between control processor 208, storage 210, memory 212, communications component 204, and any other component included in media device 200.

In some embodiments, media device 200 may be coupled to one or more other devices (not shown) for performing any operation that may require media device 200 and any other device to be coupled together. Media device 200 may be coupled to a host, slave, master, and/or accessory device. The other device may perform operations such as data transfers and software or firmware updates. The other device may also execute one or more operations in lieu of media device 200 in some embodiments (e.g., when memory 212 does not have enough memory space, or processor 208 does not have enough processing power to perform the operations efficiently).

Alternatively, the other device may perform one or more operations in conjunction with media device 200 so as to increase the efficiency of media device 200. For example, if media device 200 needs to perform several steps in a process, media device 200 may execute some of the steps while the other device executes the rest. The other device may be a device that is capable of functioning like media device 200 (e.g., a device that is capable of presenting media items). In some embodiments, a plurality of media devices may be coupled to another device, and may share data using the other device as a server.

Figure 3A:
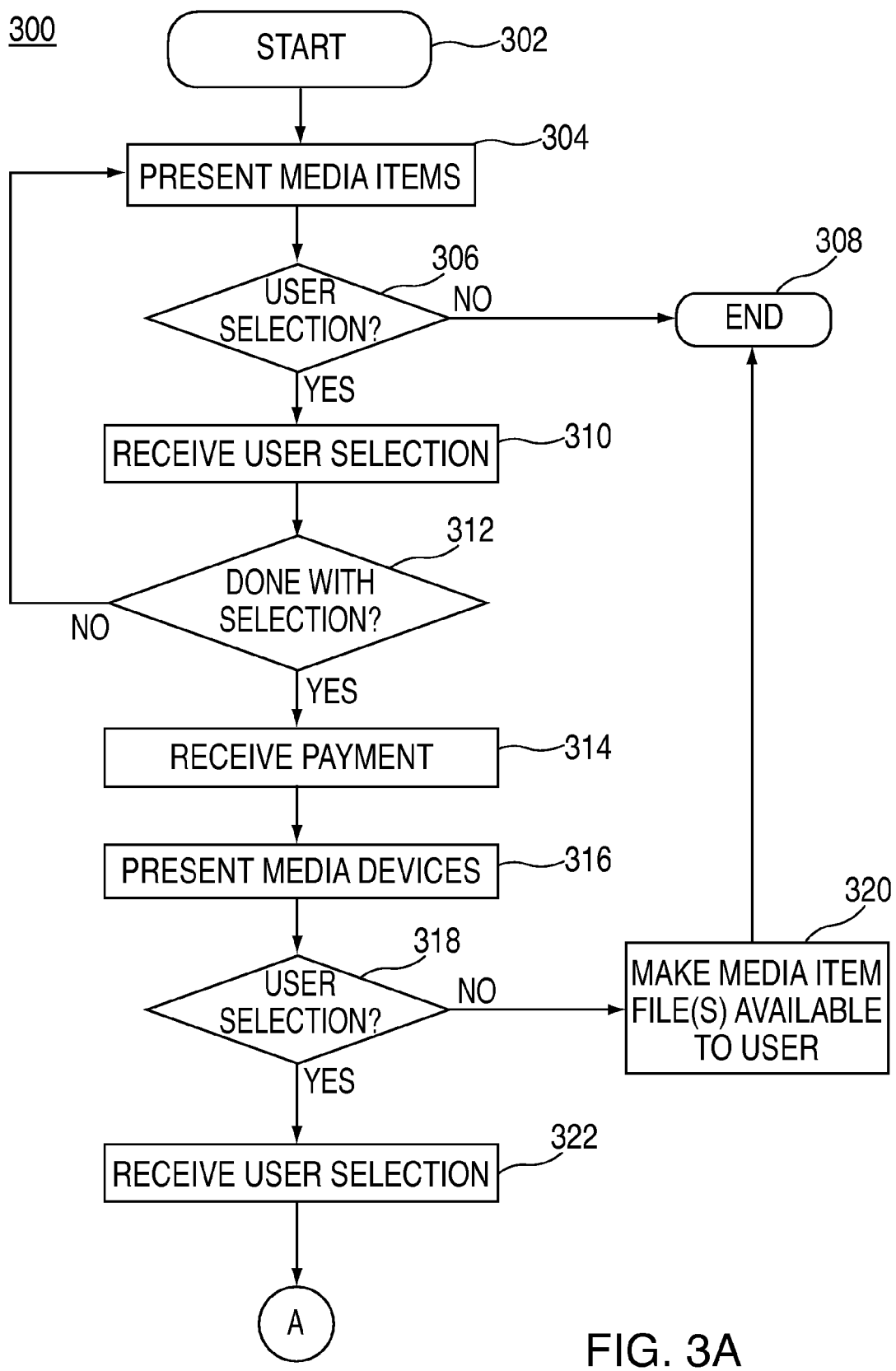
FIGS. 3-7 are simplified logical flowcharts of illustrative methods in accordance with embodiments of the invention.
Figure 3B:
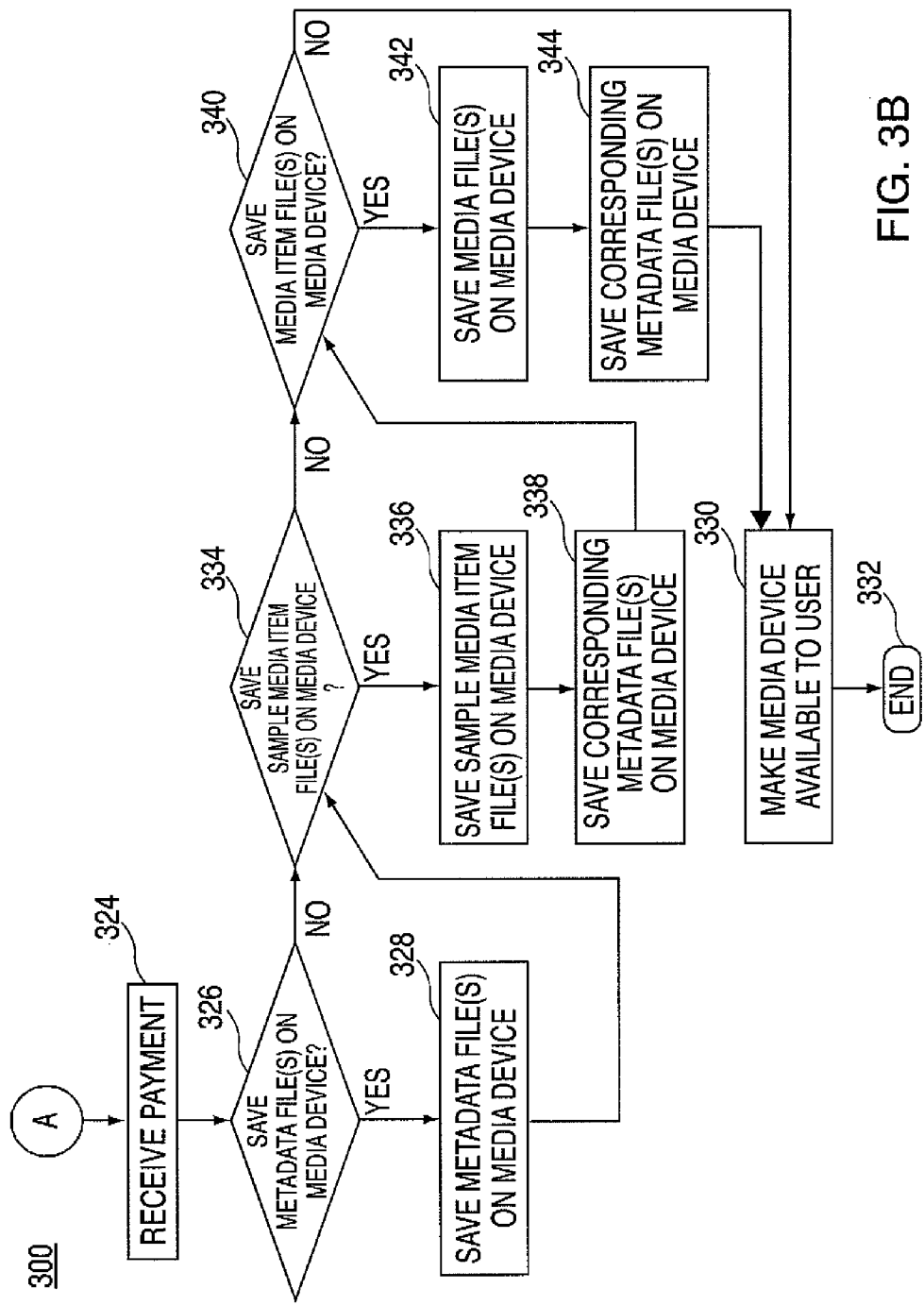

FIGS. 3A and 3B, for example, show a media purchasing process 300 in accordance with some embodiments of the invention. Process 300 may be associated with a media store, a media storage server, a media purchase server, and a client device having an MMA or a media device having an MMA (each of which may sometimes be referred to herein as an MMA device). The MMA device, media store, media storage server, and media purchase server may respectively be client device 108 or media device 112, media store 102, media storage server 104, and media purchase server 106 as discussed above in connection with FIG. 1. Process 300 may also be associated with other devices and servers.

Process 300 may begin at step 302. At step 304, the system can present a user with information about a plurality of media items available in a media store. A media purchase server can send information about the plurality of media items to the MMA of the MMA device (e.g., MMA 110 of client device 108 or MMA 110' of media device 112 of FIG. 1). The MMA can then present the information to the user. The user can browse through the available media items and select one or more using the MMA. At step 306, the media purchase server can wait for an indication of a user selection of one or more media items. The media purchase server can receive a user selection via the MMA of user's MMA device. If a selection is not received, process 300 can end at step 308, whereafter the process could be started again at step 302, for example.

Alternatively, if an indication of a selection is received (e.g., the user submits a request for a media item), the media purchase server can receive the user selection at step 310. Next, at step 312, the media purchase server can determine whether the user is done selecting media items.

If there is an indication that the user is not done selecting media items (e.g., the user expresses a desire to select more media items), process 300 can return to step 304, and the media purchasing server can present the user with other media item options.

If, however, there is a suggestion that the user is done selecting media items, process 300 can advance to step 314. At step 314, the media purchase server can receive payment for the media items. Examples of online payment methods through which the media purchase server may receive a payment are disclosed in U.S. Patent Publication 2005/0021478 and in U.S. Patent Publication 2005/0050345, each of which is hereby incorporated by reference herein in its entirety. Next, at step 316, the media purchase server can present the user with information about a plurality of media devices. The information can be presented on the MMA of the user's MMA device.

At step 318, the media purchase server can wait for a user selection of a media device. If no selection is received, process 300 can progress to step 320 where the media storage server can make the one or more selected media item file(s) available to the user. The media item file(s) may be made available by, for example, transferring the media item file(s) from the media store to the MMA of the user's MMA device, by storing a media interest indicator on a media storage server such that the user may download the media item file(s) at a later time, or by sending a media access response (e.g., a document containing download information) to be used by the MMA of the user's MMA device to download the media item file(s) at a later date. Exemplary media access response formats are disclosed in related U.S. Patent Publication 2005/0050345, which is hereby incorporated by reference herein in its entirety. Process 300 may then end at step 308.

Returning to step 318, if the media purchase server receives an indication of a user selection, process 300 may advance to step 322. At step 322, the media purchase server may receive a user selection. Next, the media purchase server may receive payment for the user-selected media device at step 324.

After receiving payment for the media device, the media storage server may determine whether the user wishes to save the selected media item(s) on the selected media device. The media storage server may also determine the format in which the media item file(s) is/are to be saved.

At step 326, the media storage server may determine whether the user wishes to save metadata file(s) associated with the selected media item(s) on the selected media device. In some embodiments, a metadata file can be an electronic file that contains information about a media item file. The information stored in a metadata file may be static or dynamic. Static metadata may include, for example, the media item title, album name, album artwork, artist, composer/producer, genre, user rating, date generated, date released, ownership information, authorization information, etc. Dynamic metadata, on the other hand, can cause an application associated with the media device to execute a series of automatic commands (e.g., modify an associated media item file, upload an associated media item file to a network server, prompt the user for instructions, etc).

Instead of storing a media item file on a media device, a user may save only a metadata file associated with the media item file to the media device or to a remote account associated with the media device (e.g., an iTunes™ account). At a later date, the media device can connect to the media store via the media storage server. The media storage server may identify the media item file associated with the metadata file stored on the media device or associated with an account linked to the media device, and may transfer the media item file to the media device. This approach may be useful if a user does not want to purchase a media item when purchasing a media device, but may want to easily access the media item with the media device at a later date. This approach may also be useful if a seller wishes to sell a media device and media items associated with the media device but does not want to actually load the purchased media items onto the device before sending the purchased device to the buyer. This approach may also be useful if a user wants to save a large number of media items to a media device, but does not have sufficient storage space to save the media item files of the media items.

Returning to step 326, if the user wishes to save the metadata file(s) on the selected media device, process 300 may advance to step 328. At step 328, the media storage server can transfer the metadata file(s) from the media store to the media device. Then, process 300 can proceed to step 334. In other embodiments (not shown), process 300 could instead proceed to step 330 (described below in more detail).

Going back to step 326, if the user does not want to save the metadata file(s) associated with the selected media item(s) on the media device, process 300 may advance to step 334. At step 334, the media storage server may determine whether the user wishes to save sample media item file(s) of the selected media item(s). If the user wants to save sample media item file(s), the media storage server can transfer the sample media item file(s) from the media store to the media device at step 336. If there are any metadata file(s) associated with the sample media item file(s), the media storage server can additionally transfer the metadata file(s) from the media store to the media device at step 338. This may be done automatically or at the user's discretion in some embodiments. Then, process 300 can proceed to step 340. In other embodiments (not shown), process 300 could instead proceed to step 330 (described below in more detail).

A sample media item file may be a media item file that includes additional metadata information. The additional metadata information may be stored in the media item file, or in an associated metadata file. The metadata information may include authorization information that allows a user to access the sample media item file with specified restrictions. For example, the user may only access the sample media item file within a specified period of time, or a specified number of times. The authorization information may also prevent a user from transferring the sample media item file from a media device to another device.

Instead of purchasing the media item files of selected media items, a user may be offered sample media item files for free or at a lower cost. In some embodiments, a purchaser of a media device may receive a media device that is pre-populated with free sample media item files without having selected any media items. A user may access sample media item files within a free trial period (e.g., within a period of time or a specified number of times). After the free trial period is over, the user may be required to purchase the associated media item to access it.

Returning to step 334, if the user does not want to save sample media item file(s) on the media device, the media storage server may determine whether the user wishes to save any media item file(s) on the media device. If the user wants to save media item file(s) on the selected media device, the media storage server may transfer the media item file(s) from the media store to the media device at step 342.

In some embodiments, metadata may be stored in a media item file. In other embodiments, metadata may be stored in a separate metadata file that is associated with the media item file. If there are any metadata file(s) associated with the media item file(s), the media storage server may additionally transfer the metadata file(s) from the media store to the media device at step 344. This may be done automatically or at the user's discretion in some embodiments. Next, the system can make the media device with the media item file(s) saved in storage available to the user at step 330 (e.g., by shipping the media device to the user). Process 300 may then end at step 332.

Returning to step 340, if the user does not wish to save the media item file(s) on the media device, process 300 can advance to step 330. At step 330, the system can make the media device available to the user at step 330 (e.g., by shipping the media device to the user). Process 300 may then end at step 332.

In some embodiments of the invention, the user may select and purchase a media device before selecting and purchasing one or more media items. The system may then pre-populate the media device with the selected one or more media items, using the steps described above in reference to FIGS. 3A and 3B.

Figure 4:
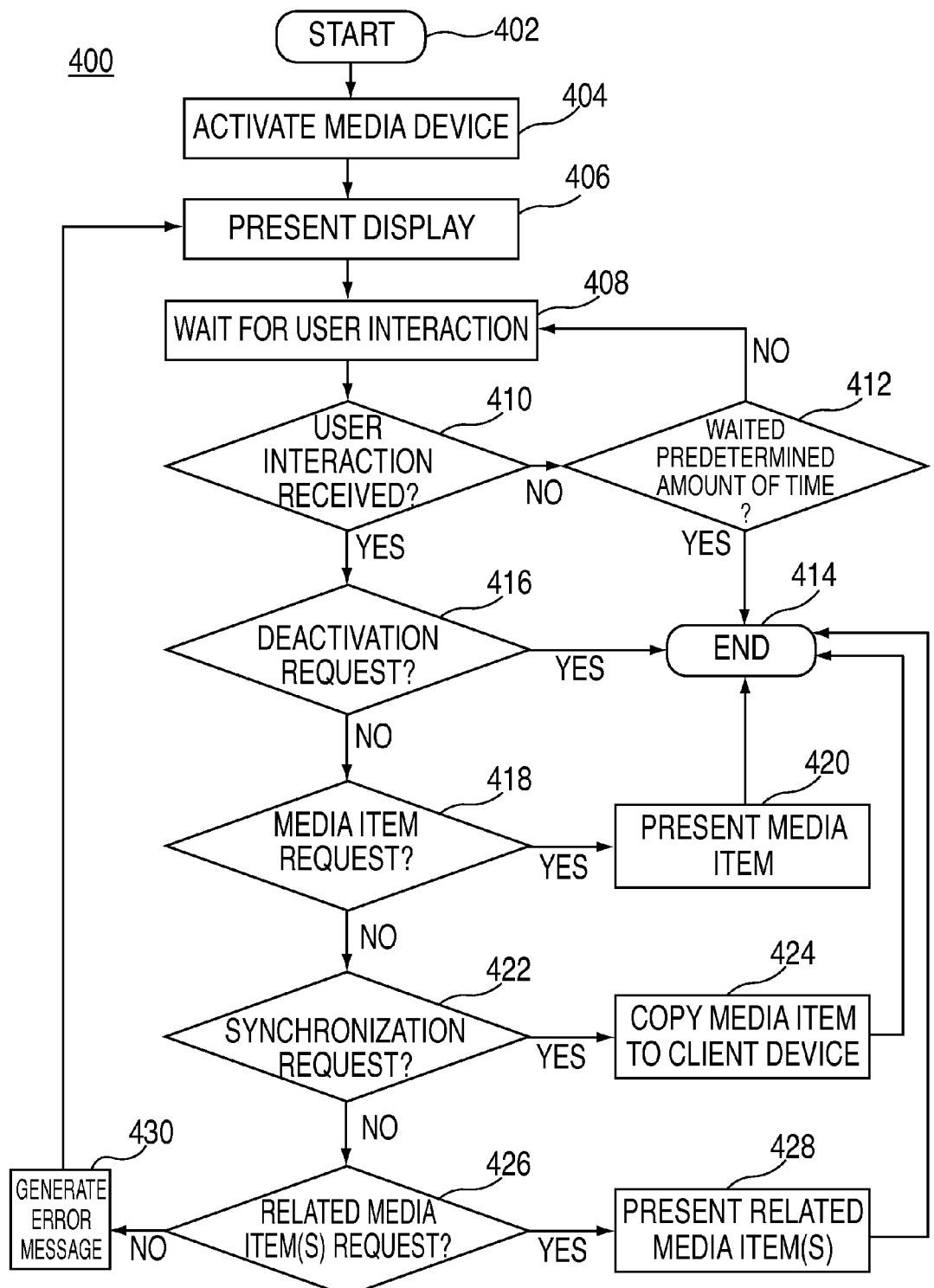

Once a user has access to a media device that is pre-populated with one or more media items, metadata files, and/or sample media items, the user may interact with the media device in several ways. FIG. 4, for example, shows some of the different ways through which a user may interact with a media device according to various embodiments of the invention.

Process 400 may begin at step 402. At step 404, the media device may be activated (e.g., turned ON or awakened from a sleep mode) either automatically or in response to a user interaction or a command from another device. For example, the media device can be an iPod™ that may be powered down until a user interacts with, for example, its click wheel. As another example, the media device can be a cellular telephone that is activated in response to receiving a wireless signal from a cellular telephone tower.

Once the media device is activated, one or more components of the media device may present a display or interface to the user at step 406. The display may present options available to the user that are related to the function the media device is performing or may be about to perform.

At step 408, the media device may wait for a user interaction. The user may interact with the media device via an input component, or by in any other suitable way. For example, the user may interact with the media device using input/output component 202 as discussed above in reference to FIG. 2. At step 410, the media device may determine whether the media device has received an indication of a user interaction. If there is no indication of a user interaction, process 400 may proceed to step 412, and the media device may determine whether it has waited a predetermined amount of time.

If the media device has not waited for a predetermined amount of time, process 400 may advance to step 408, and the media device may continue waiting for a user interaction. If, however, a predetermined amount of time has elapsed, process 400 may end at step 414. For example, the media device may automatically shut down, turn on a screen saver, enter a sleep mode, or execute any other suitable function to conserve power.

Alternatively, if the media device receives a user interaction at step 410, the media device can verify whether the user wants to deactivate the media device at step 416. If the user wants to deactivate the media device, process 400 may end at step 414.

On the other hand, if the user does not wish to deactivate the media device, process 400 may advance to step 418, where the media device may determine whether the user interaction was a request for a media item. For example, the user may have selected to play an audio file on the media device. In response to receiving a request for a media item, the media device may present the media item at step 420.

Returning to step 418, if the user interaction was not a request for a media item, process 400 may progress to step 422. At step 422, the media device may determine whether the user interaction included a synchronization request for a media item. If the user interaction included a synchronization request, the media item may synchronize the media item at step 424. For example, the media item may be synchronized to an MMA, such as an MMA of the media device itself or an MMA of an associated client device (e.g., client device 108 of FIG. 1), for example. If, however, the user interaction did not include a synchronization request, process 400 may advance to step 426.

At step 426, the media device may determine whether the user interaction was a request for one ore more other media items that are related to a media item. If the media device determines that the user interaction included a request for one or more related media items, process 400 may advance to step 428. At step 428, the media device may present the one or more related media items to the user.

Returning to step 426, if the media devices determines that the user interaction was not a request for related media item(s), the media device may generate an error message at step 430. The error message may include an indication that the user interaction was invalid. After generating the error message, the media device may repeat step 406 and other subsequent steps in process 400.

FIGS. 5A-5E, for example, show the steps involved in presenting a media item to a user according to some embodiments of the invention. Process 500 may be executed in response to receiving a request for a media item (e.g., in response to step 418 of process 400 shown in FIG. 4). Process 500 may be associated with a media store, a media storage server, a media purchase server, a media device and/or a client device. The media device may be any of the media devices discussed above in connection with FIGS. 1 and 2. The client device, media store, media storage server, and media purchase server may respectively be client device 108, media store 102, media storage server 104, and media purchase server 106 as discussed above in reference to FIG. 1. Process 500 may also be associated with other devices and servers.

Process 500 may begin at step 502. At step 504, the media device may identify the one or more files associated with the media item request received prior to the implementation of process 500. At step 506, the media device may determine whether the identified file is a metadata file and/or associated with a metadata file. If the file is not a metadata file or associated with a metadata file, process 500 can advance to step 508, where the media device may determine whether the identified file is a sample media item file and/or associated with a sample media item file.

If the file is not a sample media item file or associated with a sample media file, the media device may determine that the identified file is a media item and present the media item at step 510. The media device may present the media item by, for example, playing or allowing the user to view the media item. The media device may present the media item using any suitable output component (e.g., output component 202 of FIG. 2). After presenting the media item, process 500 may end at step 512.

Returning to step 506, if the media device determines that the identified file associated with the media item request is a metadata file or is associated with a metadata file, the media device may verify whether the user has the authorization to play the media item file associated with the metadata file. For example, if the user purchased the media item associated with the metadata file, but opted to save only the metadata file and not the media item file (e.g., to save storage space in the media device), the user may be authorized to access the media item file. On the other hand, if the user requested the metadata file without paying for the media item (e.g., in order to access the media item file at a later date), the user may not be authorized to play the media item file without purchasing it.

Different approaches may be used to authorize a user to access the media item file associated with a metadata file. In one approach, the metadata may include authorization information that the media device can access upon receiving a request for the media item associated with the metadata. When the authorization code is included in the metadata, the media device may automatically access the corresponding media item file from a media store without any user interaction. In some embodiments, the media device may access the media item file upon receiving a request for the media item. In other embodiments, the media device may access the media item file upon activation of the media device (e.g., when the media device is initially powered ON).

In another approach, the user may be sent authorization information (e.g., an authorization code) that the user may present to access the media item associated with the metadata file. The authorization information may be sent to the user manually (e.g., included in the packaging of the media device when the media device is shipped to the user) or electronically (e.g., by sending a media access response to be used by the MMA of a client device associated with the media device, such as MMA 110 of client device 109 of FIG. 1, or the MMA of the media device itself, such as MMA 110' of media device 112 of FIG. 1, to download the media item file).

Returning to process 500, the media device may verify whether the user is allowed to access the media item file associated with the metadata file. At step 514, the media device may determine whether the metadata in the metadata file includes authorization information for accessing the media item. If the metadata does not include authorization information, process 500 may advance to step 516. At step 516, the media device may establish whether the user has authorization information (e.g., an authorization code). If the user does not have authorization information, the media device may determine whether the user wishes to purchase the media item. At step 518, the media device may establish whether the user indicated a purchase request for the media item. If the user does not wish to purchase the media item, process 500 may end at step 520.

Alternatively, if it is determined that the metadata includes authorization information (e.g., at step 514), that the user has authorization information (e.g., at step 516), and/or that the user has indicated a purchase request (e.g., at step 518), process 500 may advance to step 522. At step 522, the media device may establish whether there is a connection available between the media device and a media storage server (e.g., media storage server 104) or between the media device and a client device (e.g., client device 108). A connection to a media storage server may be sought for either directly between the media device and the media storage server (e.g., via link 117' and data network 118 of FIG. 1) or between the media device and a client device (e.g., client device 108 via link 117), which in turn may be connected to a media storage server (e.g., via link 117 and data network 118 of FIG. 1).

If there is no connection available between the media device and the client device or directly between the media device and a media storage server, the media device may determine whether it has waited a predetermined amount of time to find an available connection. In some embodiments, the media device may be configured to wait a specified amount of time when determining whether there is a connection available between devices and/or servers. In other embodiments, the user may indicate the amount of time the media device has to wait when determining whether there is a connection available between devices and/or servers. In these and any other embodiments where the system has to discover an available connection, the media device may be configured to display the amount of time it has been waiting to find a connection.

Going back to step 524, if the media device has not been waiting a predetermined amount of time, process 500 may return to step 522 and the media device may determine whether there is a connection available between the media device and the client device or media storage server. If, however, the media device has waited the predetermined amount of time, process 500 may proceed to step 526.

At step 526, the media device may generate an error message informing the user that the media device was unsuccessful in finding a connection between the media device and the client device or the media device and the media storage server. After generating the error message, the media device may present the user with a display that includes the error message. The media device may present the error message using any suitable display component (e.g., display component 206 of FIG. 2). After displaying the error message, process 500 may end at step 530.

Returning to step 522, if the media device determines that there is a connection available between the media device and the media storage server, the media device may establish the connection at step 531. The media device may connect to the media storage server using any suitable connection (e.g., communications link 117' of FIG. 1).

Returning to step 522, if the media device determines that there is a connection available between the media device and the client device, the media device may establish the connection at step 532. The media device may connect to the client device using any suitable connection (e.g., communications link 116 of FIG. 1). Next, at step 534, the client device may verify whether there is a connection available between the client device and a media storage server. If the client device discovers that there is no connection available between the client device and the media storage server, process 500 may advance to step 536. At step 536, the client device may determine whether it has waited a predetermined amount of time to find the connection. If the client device has not been waiting for the predetermined amount of time, the client device may continue searching for a connection between the client device and the media storage server at step 534.

If, however, the client device has been waiting for the predetermined length of time, process 500 may return to step 526. At step 526, the client device may generate an error message indicating the inability to discover a connection between the client device and the media storage server. Next, the client device may display the generated error message at step 528, and process 500 may end at step 530.

Returning to step 534, if the client device finds a connection between the client device and the media storage server, the client device may establish the connection at step 538. The client device may connect to the media storage server using any suitable connection (e.g., any of the connections discussed above with reference to FIG. 1, such as link 117 via data network 118).

Next, at step 540, once the media device has connected to the media storage server, either directly or via a client device, the media storage server may identify the media item file associated with the metadata file in a media store. The device directly connected to the media store (e.g., the media device or the client device, which may be referred to herein as the "connected device") may then determine whether the media device has the capacity to store the identified media item file at step 542. If the media device does not have the storage capacity for the media item file, process 500 may return to step 526. At step 526, the connected device may generate an error message informing the user of the lack of storage space. The connected device may present a display with the error message to the user at step 528, and process 500 may end at step 530.

Returning to step 542, if the connected device determines that there is enough storage space in the media device for the media item file, process 500 may proceed to step 544. At step 544, the client device may determine whether a payment is needed in order to access the media item file. For example, the user may have indicated a request to purchase the media item at step 518.

If a payment is needed to access the media item file, process 500 may advance to step 546. At step 546, the connected device may determine whether a connection is available between the connected device and a media purchase server. If there is no connection available between the connected device and the media purchase server, process 500 may proceed to step 548 where the connected device may determine whether it has waited a predetermined length of time to discover a connection.

If the connected device has not been waiting the predetermined amount of time, process 500 may return to step 546, and the connected device may continue searching for a connection between the connected device and the media purchase server. If, on the other hand, the connected device has waited the predetermined amount of time, process 500 may return to step 526. At step 526, the connected device may generate an error message about the lack of connection between the connected device and the media purchase server. Next, the connected device may present a display with the error message at step 528, and process 500 may terminate at step 530.

Returning to step 546, if the connected device determines that there is a connection available between the connected device and the media purchase server, the connected device may establish the connection at step 550. The connection may be any of the connections discussed above with reference to FIG. 1. Next, the media purchase server may receive payment for the media item at step 552.

After the media purchase server receives payment for the media item or after the connected device determines that no payment is needed for the media item (at step 544), process 500 may advance to step 554. At step 554, the media item file may be transferred from the media store to the connected device via the media storage server. Next, at step 556, the media item file may be transferred from the connected device to the media device via the connection between the client device and the media device if the connected device is the client device, otherwise this step may be skipped, for example.

The connected device may then update the metadata information in the metadata file at step 558. As an example, the connected device may update the metadata file to include information such as, but not limited to, the date of transfer of the media item file, the duration of transfer, information about the connected device used for the transfer, etc.

Once the metadata information has been updated, process 500 may proceed to step 560. At step 560, the connected device may close the connection between the media device and the data network and/or the client device, and process 500 may end at step 562.

Returning to step 508, if the media device establishes that the file associated with the media item request is a sample media item file, process 500 may advance to step 564. At step 564 and in subsequent steps, the media device may determine whether the user has the right to access the sample media item file. If the user is allowed to access the sample media item file, the media device may present the media item associated with the file to the user.

Figure 5A:
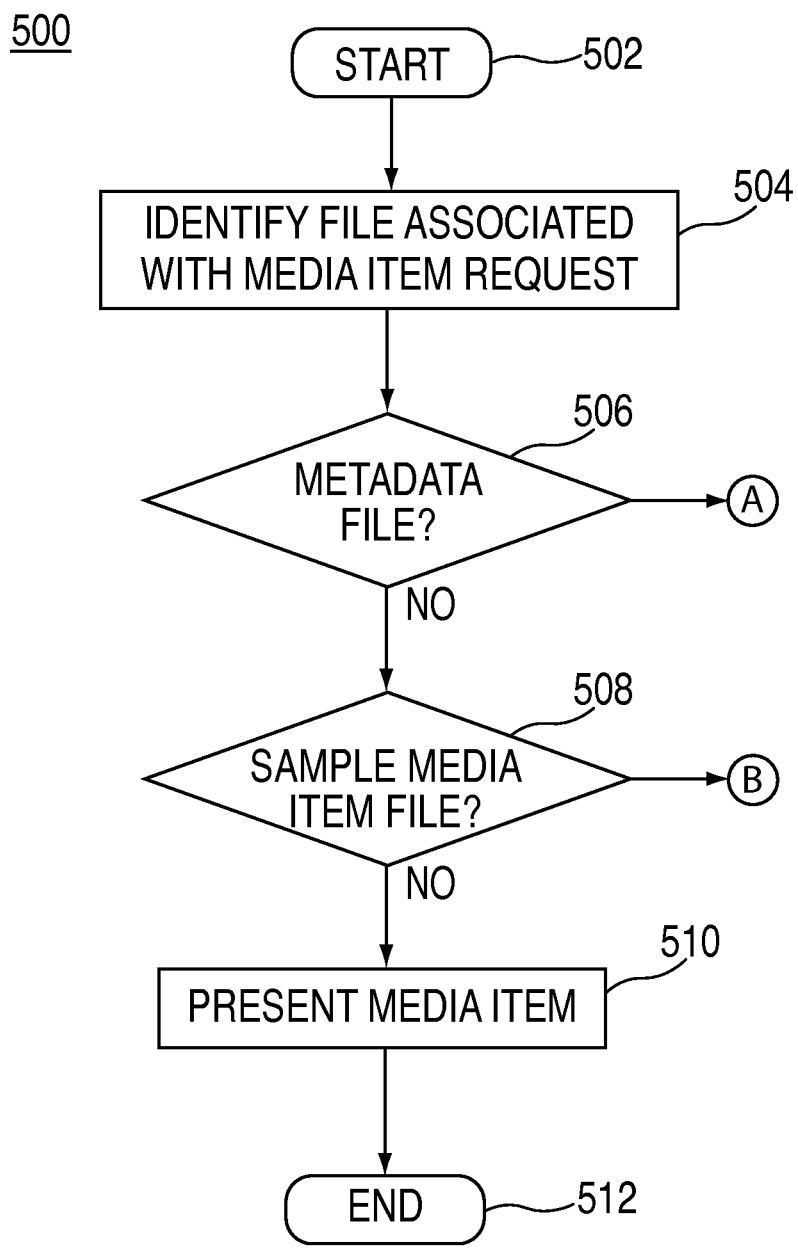
Figure 5B:
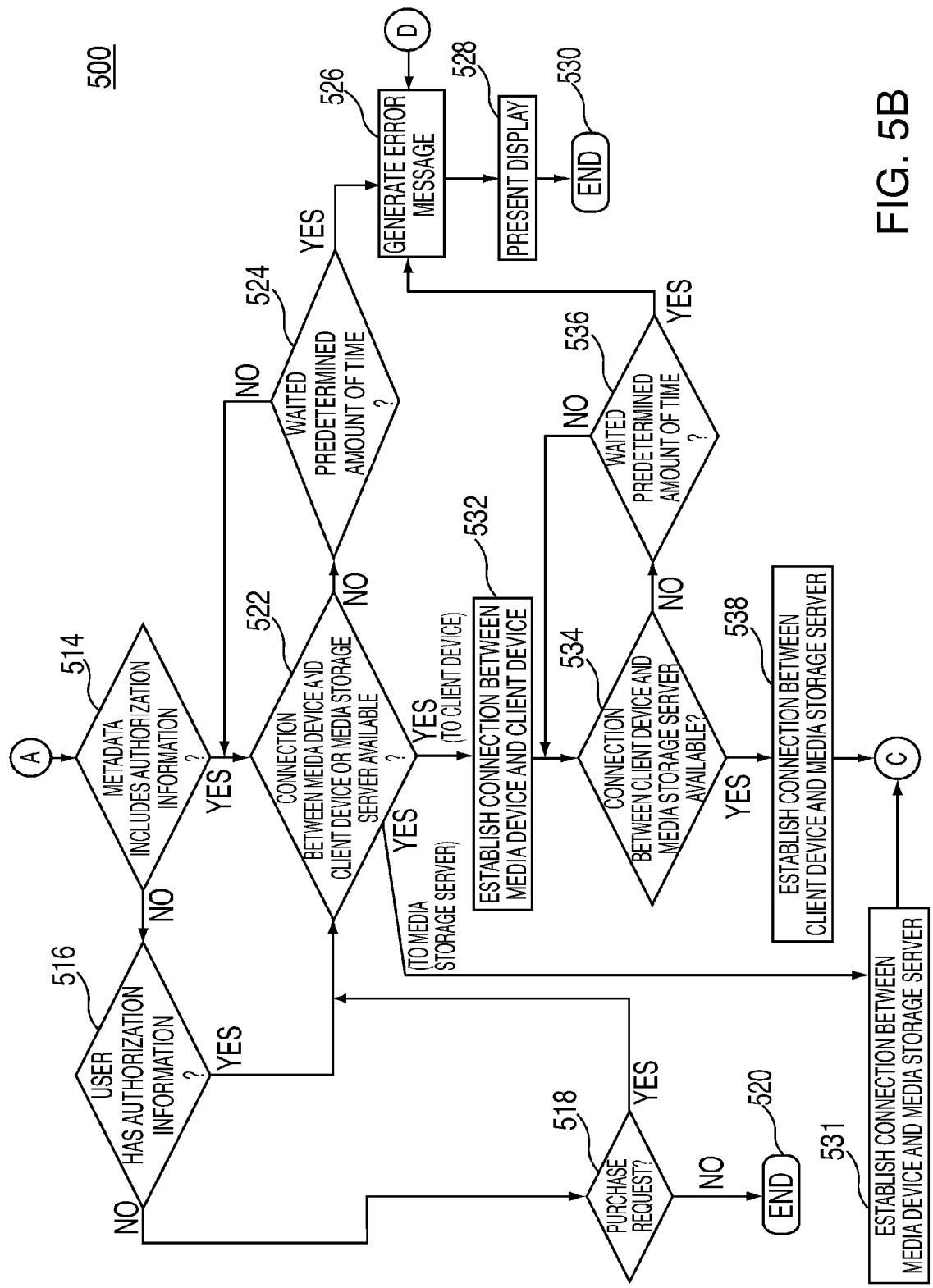
Figure 5C:
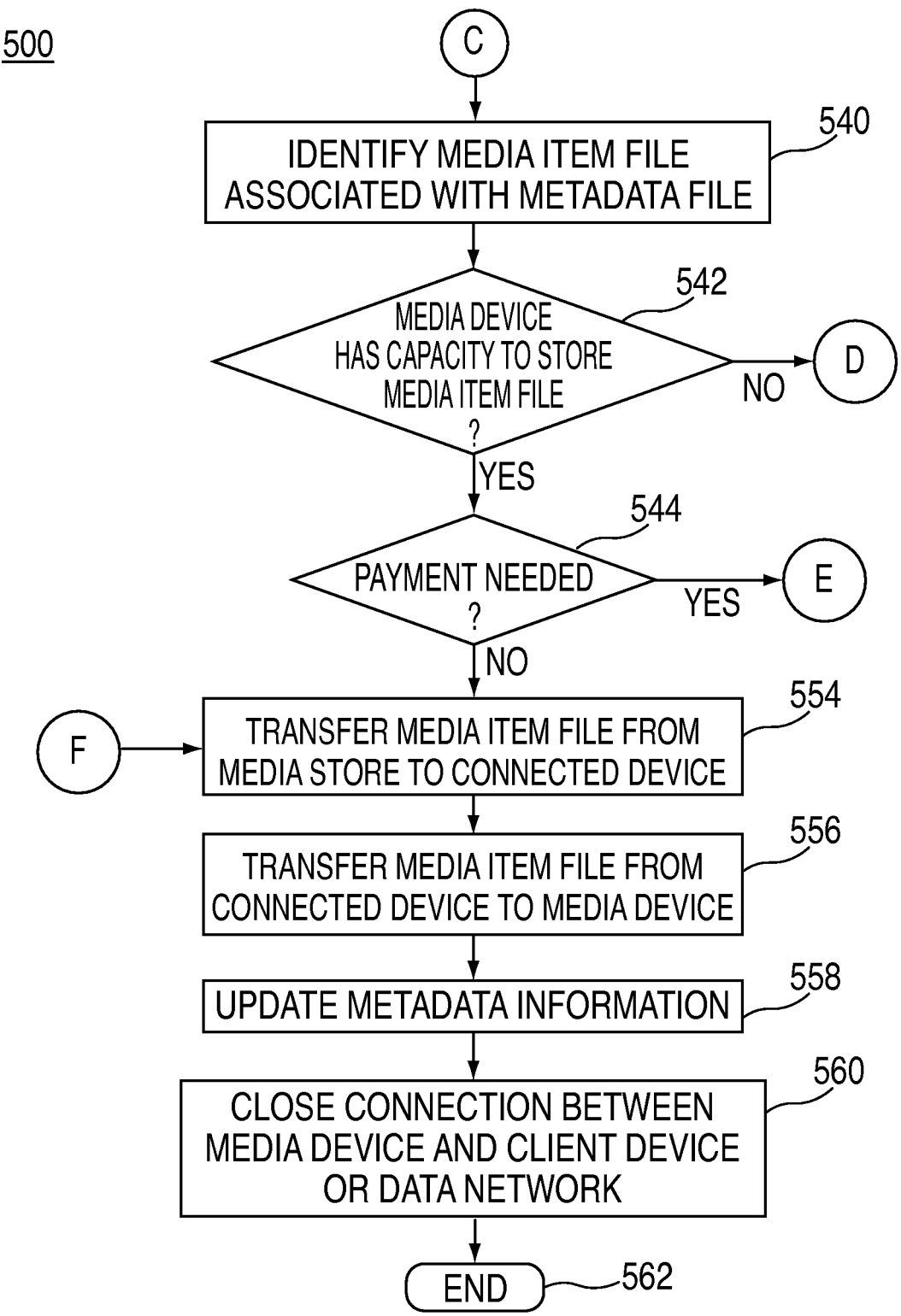
Figure 5D:
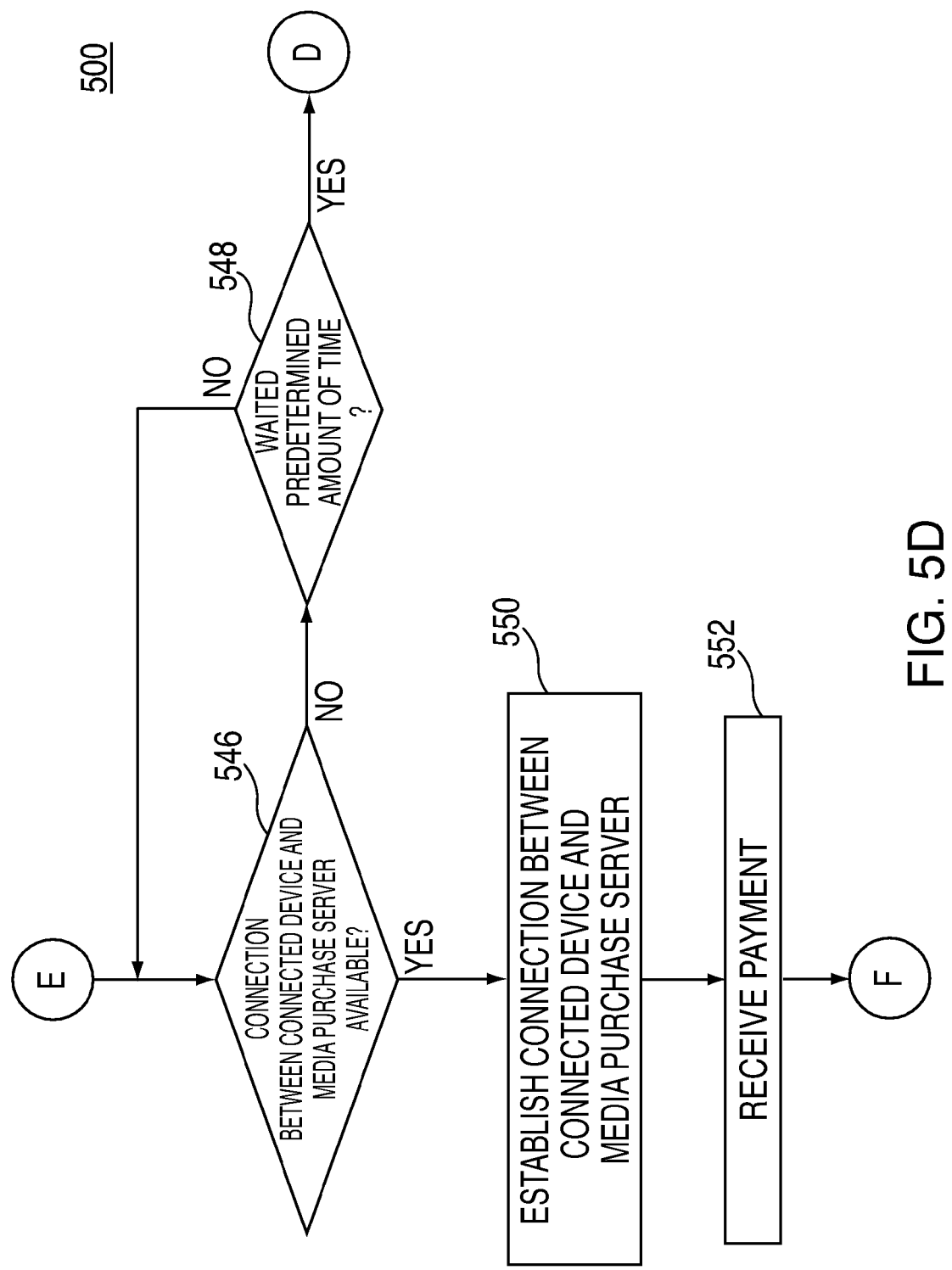
Figure 5E:
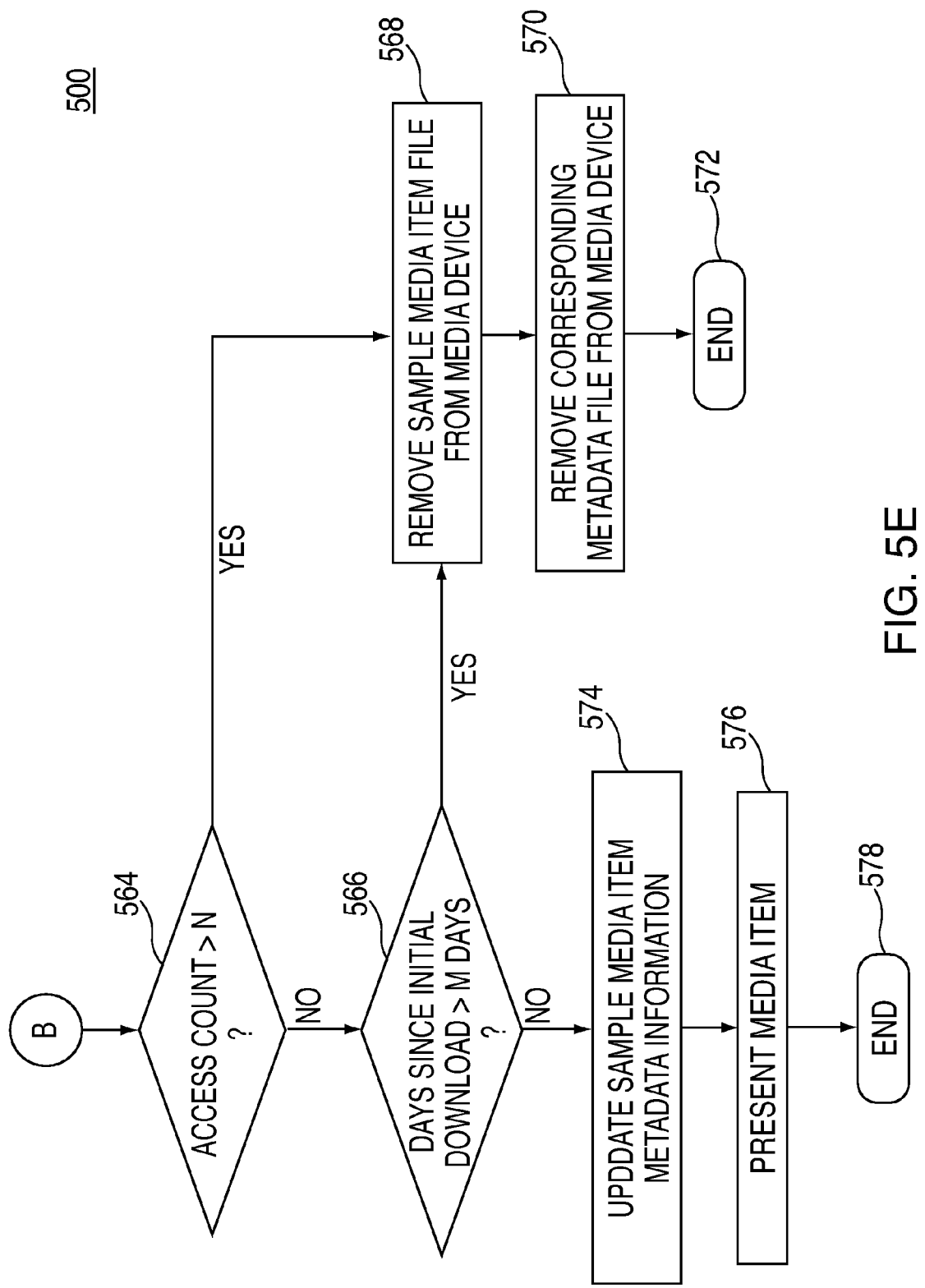
Figure 6A:
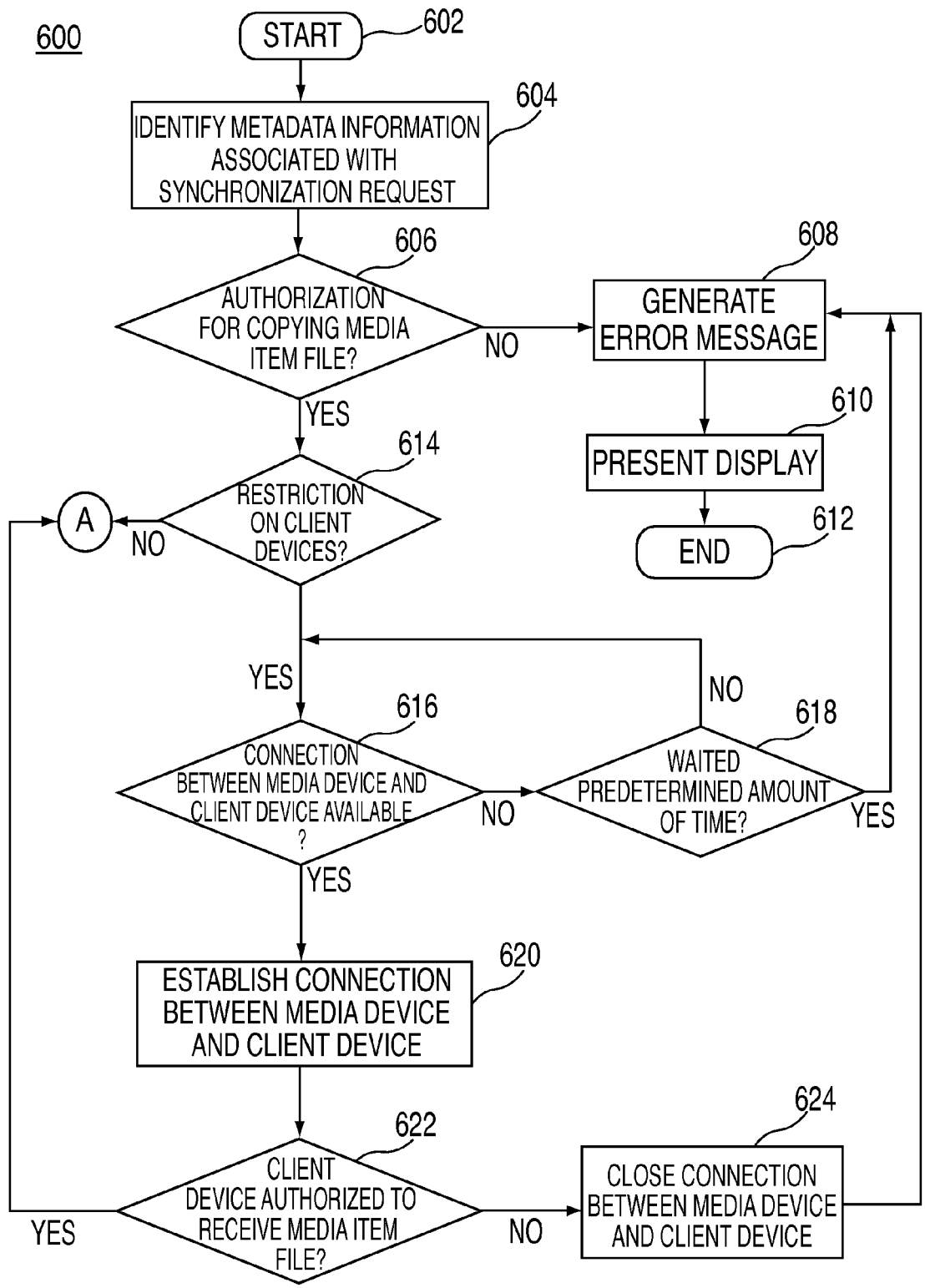
Figure 6B:
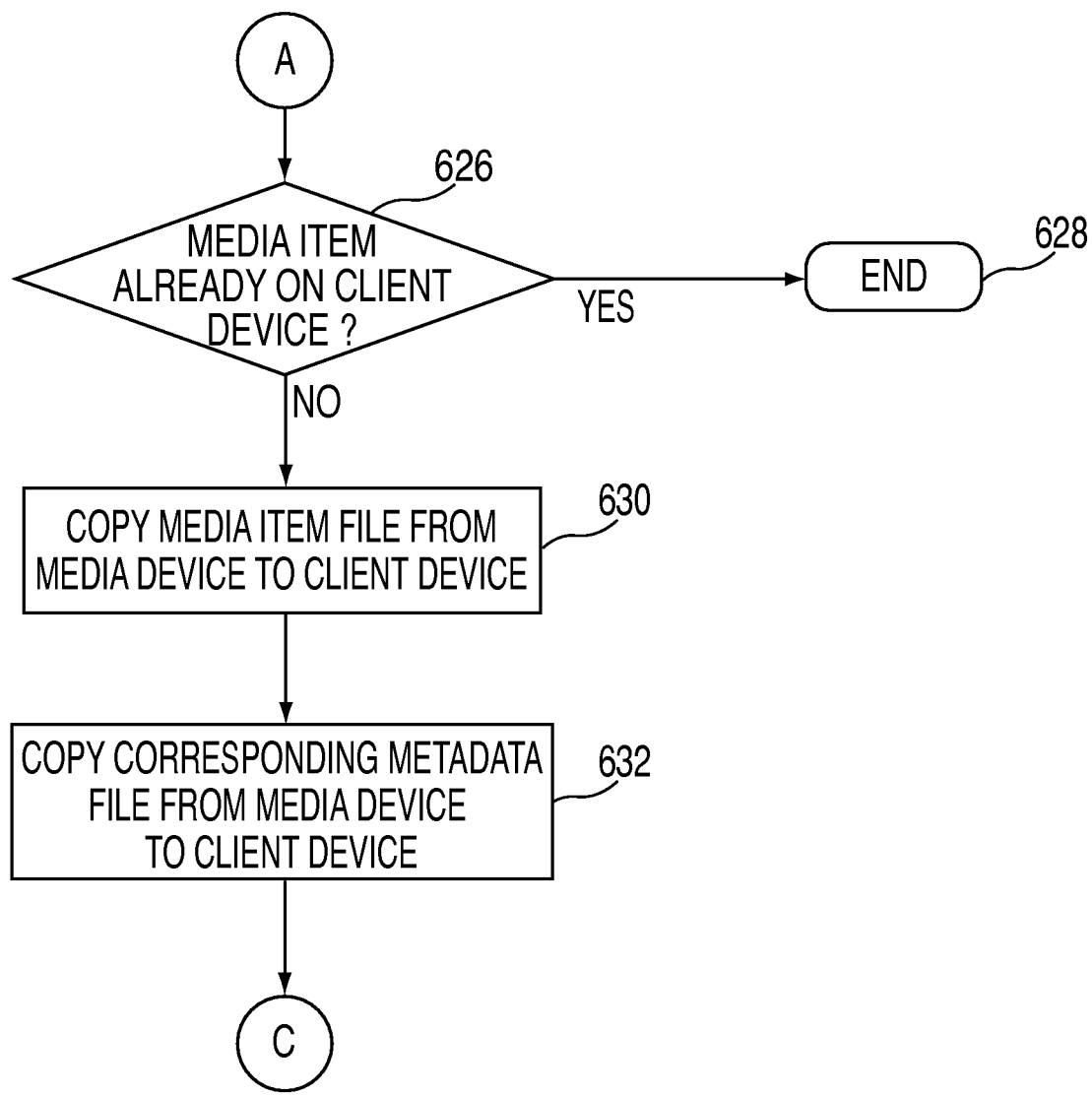
Figures 6C, 6D:
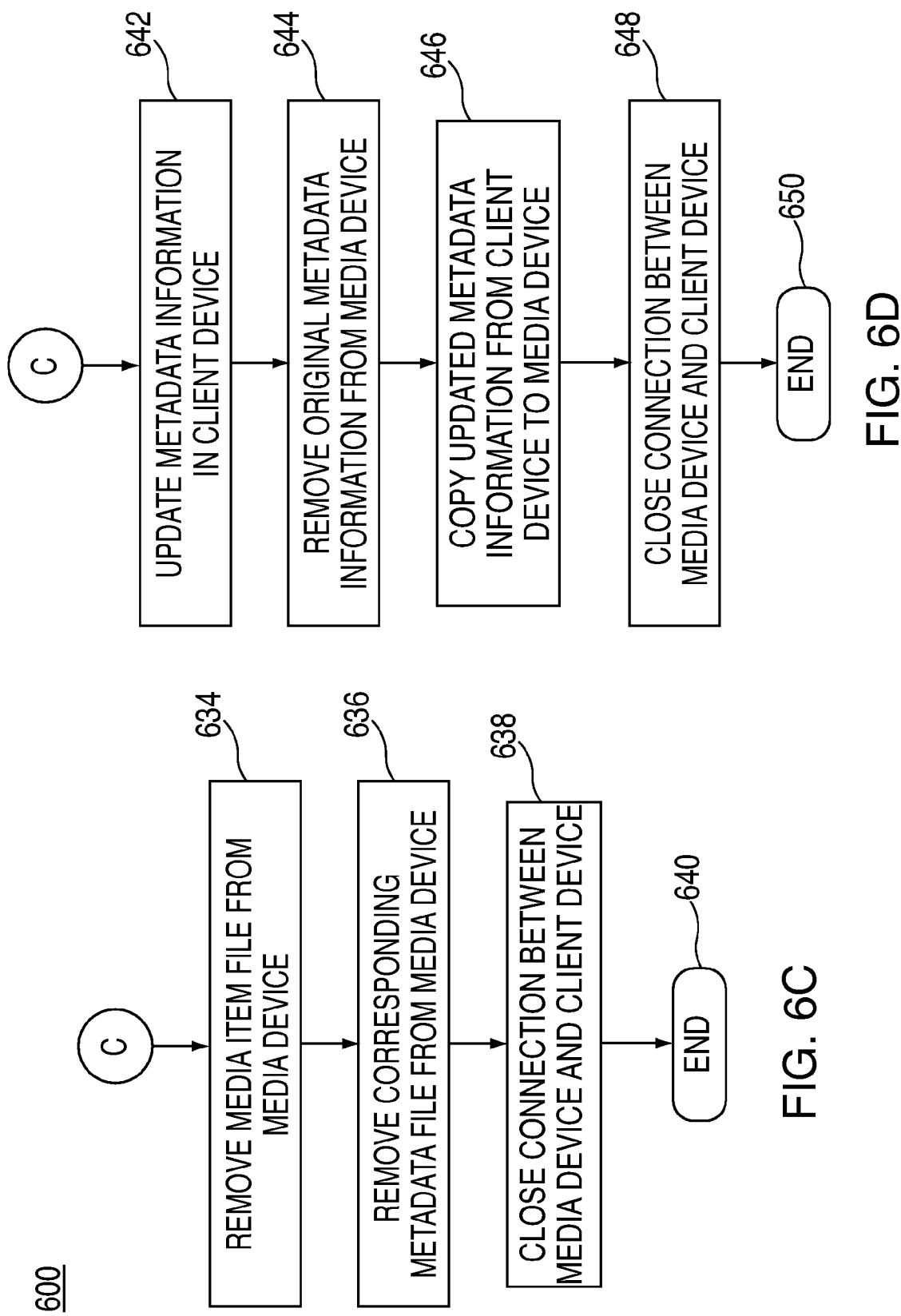

In some embodiments of the invention, variables may be maintained for a sample media item file to facilitate the determination of whether a user has the right to access the sample media item file. In the example of FIG. 5E, the variables are the access count or the number of times the user has accessed the sample media item file (e.g., an integer N), and the number of days since the initial download of the sample media item file to the media device (e.g., an integer M), but many other number and types of variables may be used according to the invention.

At step 564, the media device may determine whether the access count is greater than N. In some embodiments, N may be set to be a very large integer, such that the user may be allowed to access the sample media item file a substantially infinite number of times. In these embodiments, the user may only be restricted by M. If the media device determines at step 564 that the access count is less than N, process 500 may advance to step 570.

At step 566, the media device may determine whether more than M days have passed since the initial download of the sample media item file to the media device. In some embodiments, M can be set to be a very large integer so that a user may be allowed to access a sample media item file over a substantially infinite period of time. In such embodiments, the user may only be restricted by the access count N. In other embodiments, the user may be restricted by either N or M. As an example, if N and M are both set to be equal to three, the user may be allowed to access a sample media item file on a media device three times or within three days after the sample media item file has been saved on the media device.

If the media device determines at step 566 that more than M days have passed since the sample media item file was downloaded to the media device or if the media device determines at step 564 that the sample media item file has been accessed more than N times, process 500 may advance to step 568. At step 568, the media device may remove the sample media item file from the media device so the user cannot access it in the future. If the sample media item file is associated with a metadata file, process 500 may proceed to step 570 where the media device may remove the corresponding metadata file. Process 500 may then end at step 572.

Returning to step 566, if the media device determines that less than M days have passed since the sample media item file was initially downloaded, process 500 may advance to step 574. At step 574, the media device may update the metadata information associated with the sample media item file. The metadata information may be stored in the sample media item file, or in a corresponding metadata file, for example. The media device may update information such as the access count and the number of days since the sample media item file was initially downloaded. The media device may also update information such as the time the file was accessed, how long the file was accessed, and any other suitable information.

After updating the metadata information for the sample media item file, the media device may present the media item associated with the sample media item file at step 576. The media device may present the media item by, for example, playing or allowing the user to view the media item. The media device may present the media item using any suitable output component (e.g., output component 202 of FIG. 2). After presenting the media item, process 500 may end at step 578.

FIGS. 6A-6D, for example, show a process 600, which may be executed in response to receiving a synchronization request (e.g., in response to step 422 of process 400 as shown in FIG. 4) according to some embodiments of the invention. The synchronization request may include a request to copy a media item file from the media device to a client server. The synchronization may synchronize the media item to an MMA, such as an MMA of the media device itself (e.g., MMA 110' of media device 112) or an MMA of an associated client device (e.g., client device 108 of FIG. 1), for example. Process 600 may also be associated with other devices. The below will be described with respect to a media device synchronizing a media item to an MMA of an associated client device, but it is to be understood that it is just one embodiment. For example, in other embodiments, the media device may synchronize the media item with an MMA of the media device itself.

Process 600 may begin at step 602. At step 604, the media device may identify the metadata information associated with the synchronization request. In some embodiments, the metadata information may be included in the media item file. In other embodiments, the metadata information may be saved in a separate metadata file that is associated with the media item file.

After the metadata information has been identified, process 600 may advance to step 606. At step 606, the media device may determine from the metadata information whether there is authorization for copying the media item file. In some embodiments, the system may not allow a media item file to be copied from the media device to another device. As an example, the system may prevent a media item file from being copied again once it has already been copied once to another device. As another example, the system may allow the media item file to be copied to other devices only a limited number of times.

If the media device determines that the media item file is not allowed to be copied (e.g., it has already been copied the allowed number of times), the media device may generate an error message at step 608. The error message may include information relating that the user is not permitted to copy the media item file to the client device. After generating the error message, the media device may present a display with the error message at step 610. The media device may present the error message using any suitable display component (e.g., display component 206 of FIG. 2). Process 600 may then end at step 612.

Returning to step 606, if the media device determines that the media item file is allowed to be copied to the client device, process 600 may advance to step 614. At step 614, the media device may determine from the metadata information whether there is a restriction regarding the client devices to which the media item file can be copied. As an example, the user may be permitted to copy a media item file to only certain types of client devices. As another example, the user may be allowed to copy a media item file to only a limited number client devices.

Returning to step 614, if the media device determines that there is a restriction concerning the client devices the media item can be copied to, process 600 may proceed to step 616. At step 616, the media device may determine whether a connection is available between the media device and the client device to which the media item is to be copied.

If there is no connection available, the media device may determine at step 618 whether it has waited a predetermined amount of time to discover a connection. If the media device has not waited a predetermined amount of time, process 600 may return to step 616 and the media device may continue searching for an available connection. If, on the other hand, the media device has waited the amount of time, process 600 may return to step 608. The media device may generate an error message about the unavailability of a connection at step 608 and may present the error message to the user at step 610. Process 600 may then terminate at step 612.

If, however, the media device discovers an available connection between the media device and the client device, the media device may establish the connection at step 620. The media device may then determine at step 622 whether the client device is authorized to receive the media item file. If the client device is not authorized to receive the media item file, the media device may close the connection between the media device and the client device at step 624. Process 600 may then return to step 608 where the media device may generate an error message indicating that the client device to which the media item file was to be copied is not authorized to receive the media item file. Next, at step 610, the media device may present the error message to the user, and process 600 may end at step 612.

To determine whether a client device is authorized to receive a media item file, the media device may compare any metadata information associated with the media item file with any information available to the client device. The metadata information may be configured to include information on client devices to which the media item can be copied. As an example, the metadata information may include an indication that the media item can be copied to other media devices that are similar to the media device. As another example, the metadata information can indicate that the media item file can be copied to all host personal computers to which the media device is connected. When the media device is establishing whether a client device may receive the media item file, the media device may identify the type of client device to ensure that it is an authorized type of client device.

The metadata information may also indicate that the media item file can only be copied to client devices that have authorization information. A user may be given authorization information for a specified number of client devices (e.g., three different authorization codes). The user may then enter the authorization information into the specified number of client devices. The authorization information may for example be included in the MMA of the client devices (e.g., MMA 110 of FIG. 1). When the media device is determining whether a client device may receive a media item file, the media device may identify and verify the authorization information in the MMA of the client device (or in the MMA of the media device itself if the media device is attempting to synchronize a media item file with an MMA located locally on the media device, such as MMA 110' of media device 112 of FIG. 1, for example).

Returning to step 622, if the client device is authorized to receive the media item file, or if the media device determines at step 614 that there is no restriction on the client devices the media item can be copied to, process 600 may advance to step 626. At step 626, the media device may determine whether the media item file is already on the client device. The media device can do this by comparing the media items stored on the media device with the media items stored on the client device.

In some embodiments, the comparison of the media items stored on the media device and the client device may be done by comparing one or more media attributes of the various media items. A media item on a client device may be deemed to be the same as the media item on a media device if one or more of their media attributes match sufficiently. Examples of media attributes may include media item title, album name, artist name, composer/producer, and genre. Other media attributes may pertain to the quality characteristics of the media item. Examples of such media attributes may include bit rate, sample rate, equalization setting, volume adjustment, start time, stop time, and total time. Many various other media attributes may be used according to the invention.

Returning to step 626, if the media device determines that the media item is already on the client device, process 600 may end at step 628. Alternatively, if the media device determines that the media item is not already on the client device, the media device may proceed to copy the media item file from the media device to the client device at step 630. If the media item file has any metadata files associated with it, the media device may also copy the metadata file(s) from the media device to the client device at step 632.

After the media item file and any associated metadata files have been copied to the client device, process 600 may continue using one of at least two different approaches. In one approach, process 600 may advance to step 634 where the client device may remove the media item file from the media device. If there is one or more corresponding metadata files, the client device may also remove the metadata file(s) from the media device at step 636. The client device may then close the connection between the media device and the client device at step 638, and process 600 may end at step 640.

In an alternate approach, process 600 may proceed to step 642 after coping the media item file and any associated metadata files to the client device. At step 642, the client device may update the information in the metadata that has been copied to the client device. The metadata information may be included in the media item file, or may be included in a separate metadata file that is associated with the media item file.

The client device may update the metadata information to indicate that the media item has been copied from the media device to a client device. In some embodiments, this information may prevent the media item from being copied to another device at a future date. In some embodiments, there may be a copy count in the metadata information that keeps a count of the number of times the media item has been copied. In some embodiments, the client device may increase the copy count after the media item file has been copied.

The client device may also update the metadata information to include information such as, but not limited to, the date of synchronization of the media item file, the duration of the synchronization process, information about the media management account of the user, etc. Updating the metadata information to include information about the user's media management account on the client device may associate the media item file with the user's account so that any usage of the media item file can be traced back to the user and/or limited to that user, for example.

After updating the metadata information, process 600 may advance to step 644. At step 644, the client device may remove the original metadata information from the media device. If the original metadata information is included in the media item file, the client device may delete the original metadata information from the media item file. If, however, the original metadata information is included in a separate metadata file, the client device may delete the metadata file, for example.

After removing the original metadata information, the client device may copy the updated metadata information from the client device to the media device at step 646. The client device may then close the connection between the media device and the client device at step 648, and process 600 may end at step 650.

Figure 7A:
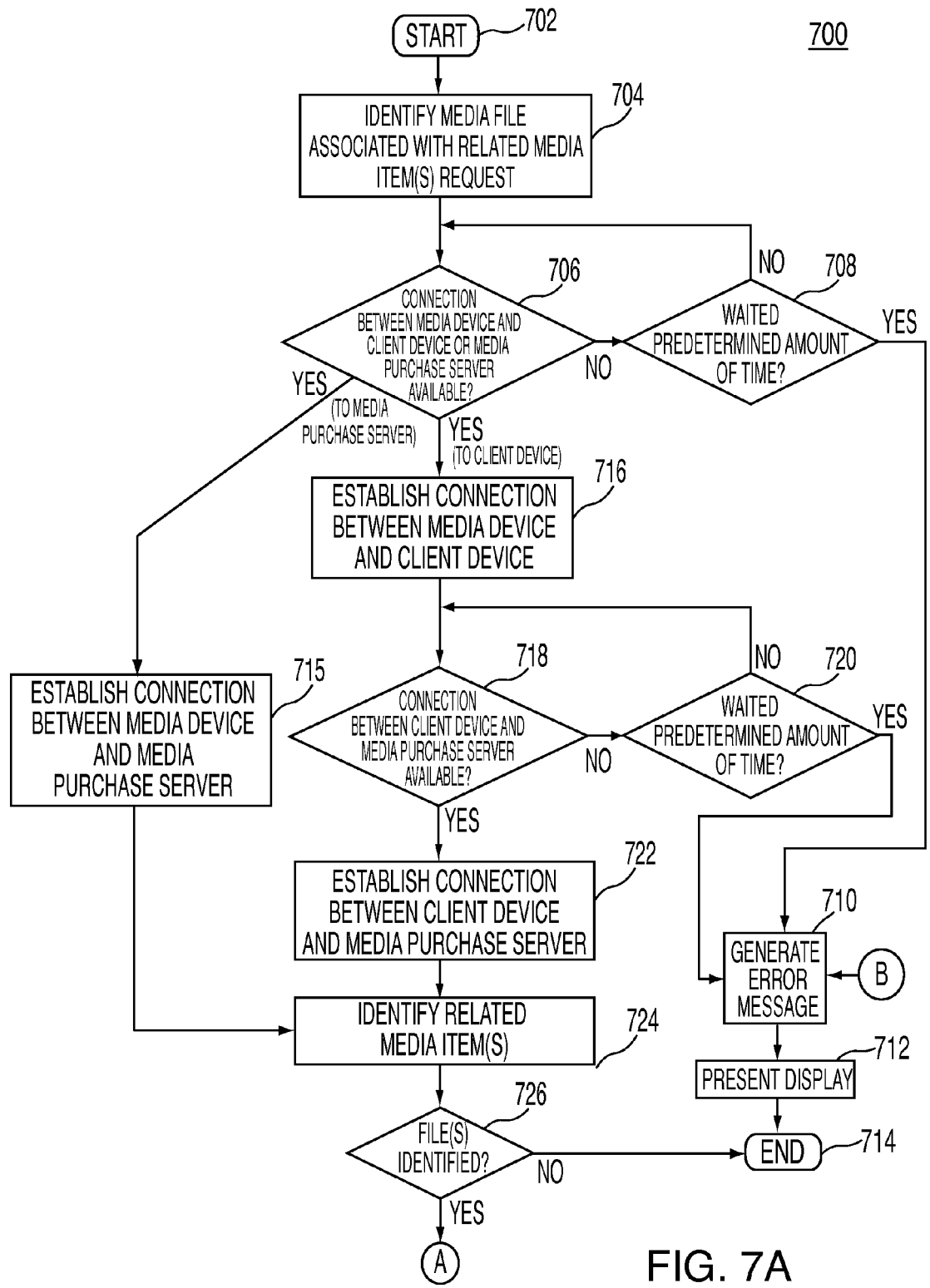
Figure 7B:
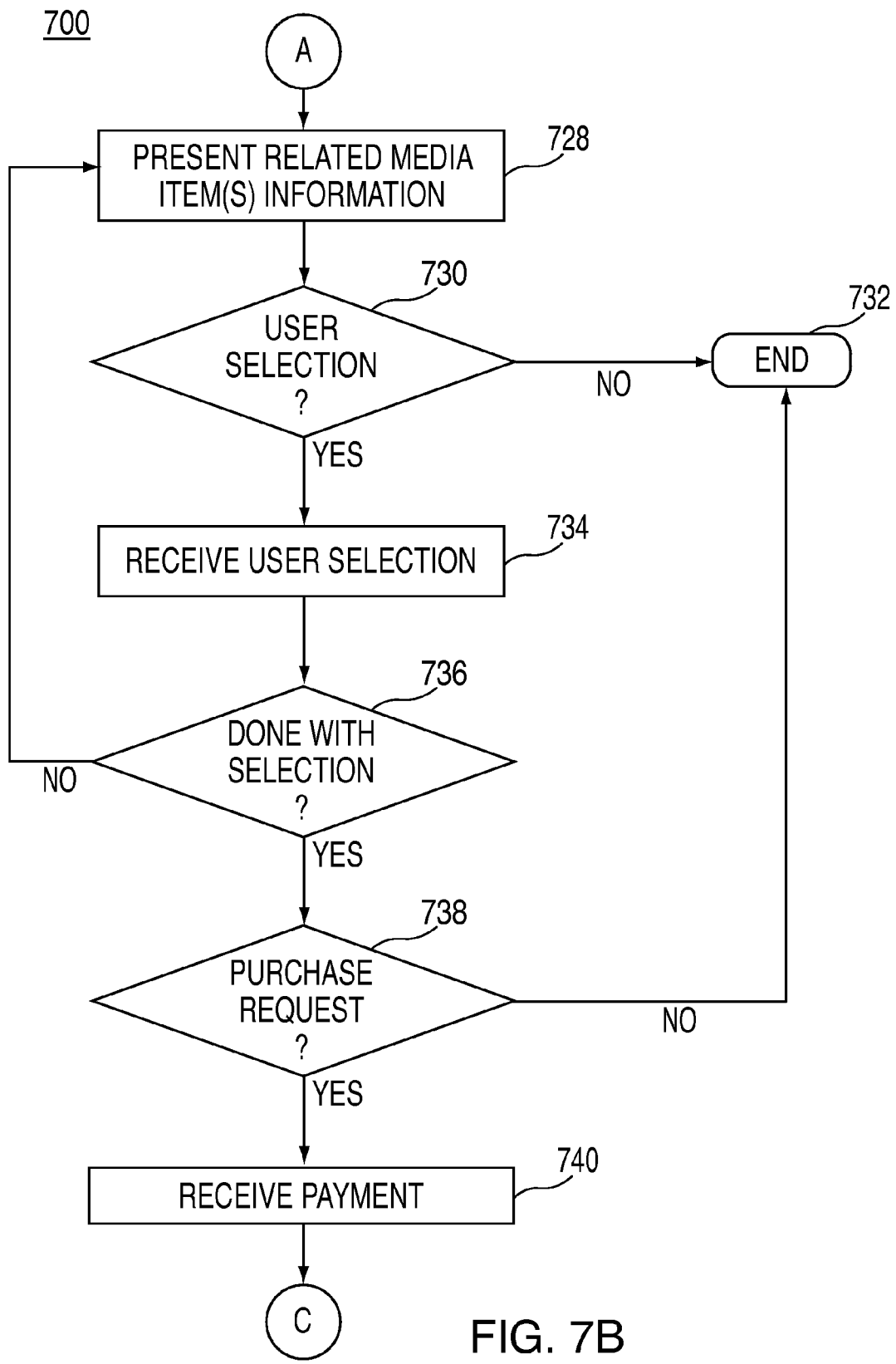
Figure 7C:
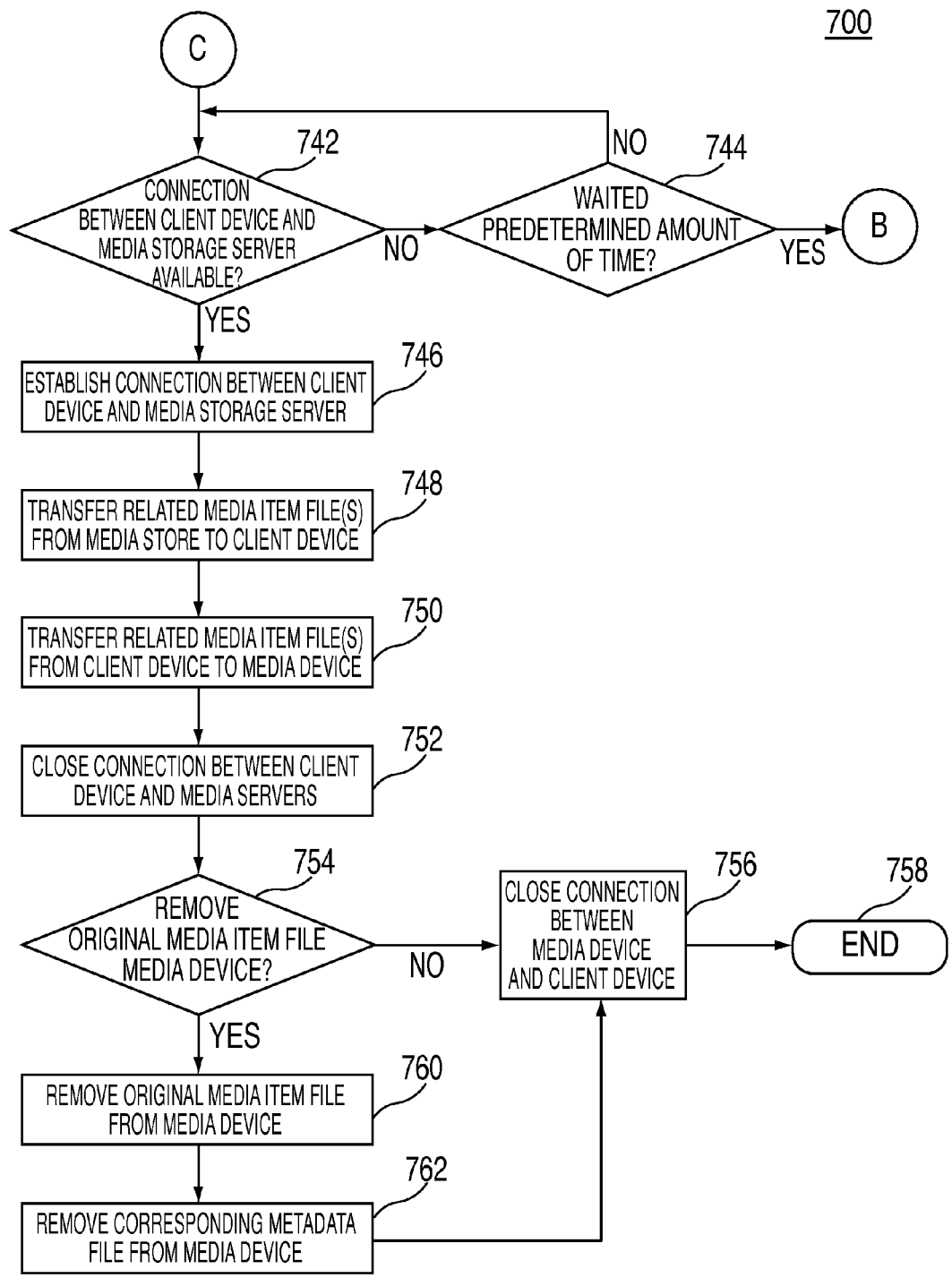

Alternatively or in addition to receiving a request for a media item and/or a synchronization request, a media device may also identify or receive a user interaction that includes a request for other media items that are related to one or more particular media items. FIGS. 7A-7C, for example, show a process 700 that may be executed in response to receiving a request for related media item(s) (e.g., in response to step 426 of process 400 as shown in FIG. 4). Process 700 may be associated with a media device, a client device, a media store, a media storage server, and a media purchase server. The media device may be any of the media devices discussed above in connection with FIGS. 1 and 2, for example. The client device, media store, media storage server, and media purchase server may respectively be client device 108, media store 102, media storage server 104, and media purchase server 106 as described above in reference to FIG. 1. Process 700 may also be associated with other devices and servers.

Process 700 may begin at step 702. At step 704, the media device may identify the one or more media files associated with the related media item(s) request. After identifying such a media file, process 700 may advance to step 706. At step 706, the media device may establish whether there is a connection available between the media device and a media purchase server (e.g., media purchase server 106) or between the media device and a client device (e.g., client device 108). A connection to a media purchase server may be sought for either directly between the media device and the media purchase server (e.g., via link 117' and data network 118 of FIG. 1) or between the media device and a client device (e.g., client device 108 via link 117), which in turn may be connected to a media purchase server (e.g., via link 117 and data network 118 of FIG. 1).

If there is no connection available between the media device and the client device or directly between the media device and a media purchase server, process 700 may advance to step 708. At step 708, the media device may determine whether it has waited a predetermined amount of time to discover a connection. If the media device has not been waiting a predetermined amount of the, process 700 may return to step 706 where the media device determines whether there is a connection available between the media device and the client device and/or the media purchase server. If, however, the media device has waited a predetermined amount of time, process 700 may proceed to step 710.

At step 710, the media device may generate an error message. The error message may inform the user that the media device was unsuccessful in finding a connection between the media device and the client device and/or the media purchase server. After generating the error message, the media device may relate the error message to the user. The media device may present the error message using any suitable output component (e.g., display component 206, FIG. 2). After relating the error message, process 700 may end at step 714.

Returning to step 706, if the media device determines that there is a connection available between the media device and the media purchase server, the media device may establish the connection at step 715. The media device may connect to the media purchase server using any suitable connection (e.g., communications link 117' of FIG. 1 via data network 118). Process 700 may then proceed to step 724.

Returning to step 706, if the media device determines that there is no connection available between the media device and the media purchase server but that there is a connection available between the media device and the client device, the media device may establish the connection at step 716. The media device may connect to the client device using any suitable connection (e.g., communications link 116 of FIG. 1). Process 700 may then proceed to step 718.

At step 718, the client device may verify whether there is a connection available between the client device and a media purchase server. If the client device discovers that there is no connection available between the client device and the media purchase server, process 700 may advance to step 720. At step 720, the client device may determine whether it has waited a predetermined amount of time to find the connection. If the client device has not been waiting for a predetermined amount of time, the client device may continue searching for a connection between the client device and the media purchase server at step 718.

If, however, the client device has been waiting for the predetermined length of time, process 700 may return to step 710. At step 710, the client device may generate an error message indicating the inability to discover a connection between the client device and the media purchase server. Next, the client device may relate the generated error message at step 712, and process 700 may end at step 714.

Returning to step 718, if the client device finds a connection between the client device and the media purchase server, the client device may establish the connection at step 722. The client device may connect to the media storage server using any suitable connection (e.g., any of the connections discussed above with reference to FIG. 1).

Next, at step 724, the media purchase server may identify the media item file(s) in the media store that are related to the media item file associated with the request. If no related media items are found, process 700 may end at step 714. If, however, one or more related media items are found, process 700 may proceed to step 728.

At step 728, the media purchase server may present the user with information about the one or more related media items. The media purchase server may send information about the one or more related media items to the MMA of the client device (e.g., MMA 110 of FIG. 1) or to the MMA of the media device (e.g., MMA 110' of FIG. 1), depending on whether the media device was able to connect to the purchase server directly or via the client device. The MMA of the connected device may then present the information to the user. The user may browse through the available media items and select one or more of them, for example, using the MMA of the connected device.

At step 730, the media purchase server may wait for an indication of a user selection of a media item. The media purchase server may receive a user selection via the MMA of the connected device. If a user selection is not received, process 700 may end at step 732.

Alternatively, if an indication of a selection is received (e.g., the user submits a request for a media item), the media purchase server may receive the user selection at step 734. Next, at step 736, the media purchase server may determine whether the user is done selecting media items. If there is an indication that the user is not done selecting media items (e.g., the user expresses a desire to select more media items), process 700 may return to step 728, and the media purchase server may present the user with other related media item options.

If, however, there is a suggestion that the user is done selecting media items, process 700 may advance to step 738. At step 738, the media purchase server may determine whether the user wishes to purchase the one or more related media items. If there is no purchase request for the related media items, process 700 may end at step 732. If, on the other hand, there is a purchase request for the related media items, the media purchase server may receive payment for the media items at step 740.

Process 700 may then advance to step 742. At step 742, the connected device may verify whether there is a connection available between the connected device and a media storage server. If the connected device determines that there is no connection available between the connected device and the media storage server, the connected device may determine whether it has waited a predetermined amount of time to find the connection. If the connected device has not been waiting for a predetermined amount of time, the connected device may continue searching for a connection between the connected device and the media storage server at step 742.

If, however, the connected device has been waiting for a predetermined length of time, process 700 may return to step 710. At step 710, the client device may generate an error message indicating the inability to discover a connection between the connected device and the media storage server. Next, the connected device may display the generated error message at step 712, and process 700 may end at step 714.

Returning to step 742, if the connected device finds a connection between the connected device and the media storage server, the connected device may establish the connection at step 746. The connected device may connect to the media storage server using any suitable connection (e.g., any of the connections discussed above with reference to FIG. 1, such as link 117' via data network 118 if the connected device is the media device, and link 117 via data network 118 if the connected device is the client device).

After establishing a connection between the connected device and the media storage server, process 700 may advance to step 748. At step 748, the media storage server may transfer the one or more related media items that were purchased at step 740 from a media store to the connected device using the connection established between the connected device and the media storage server. Next, at step 750, the connected device may transfer the one or more related media items from the connected device to the media device using the connection established between the media device and the connected device (e.g., link 116 if the connected device is client device 108 of FIG. 1). The connected device may then close the connection between the connected device and the media purchase and storage servers at step 752, and process 700 may proceed to step 754.

At step 754, the connected device may determine whether the user wishes to remove the original media item file. As an example, if the original media item is a video file of the preview of a movie and the related media item is a video file of the movie, the user may decide to remove the preview of the movie and only keep the movie itself. As another example, if the original media item includes an old episode of a program series and the related media items include recent episodes of the series, the user may wish to remove the old episode and keep the recent episodes.

Returning to step 754, if the user wishes to keep the original media item file, process 700 may advance to step 756. At step 756, the client device may close the connection between the media device and the client device (e.g., if the client device was the "connected" device). Process 700 may then end at step 758. Alternatively, if the user wishes to remove the original media item file, the connected device may remove the original media item file from the media device at step 760. If the original media item file has a metadata file associated with it, the connected device may remove the metadata file at step 762. Process 700 may then return to step 756 where the client device may close the connection between the media device and the client device. Process 700 may subsequently end at step 758.

In the course of executing any of the processes described above, one or more displays may be presented to a user. For example, FIGS. 8-13 may be presented to a user of a media device, such as any of the media devices described above, during any of the processes described above. The displays shown in FIGS. 8-13 may be presented to a user in response to, for example, the media device being activated (e.g., turned ON or awakened from a sleep mode), receiving a user selection of a display option, receiving a signal from a remote device, and/or any other stimuli.

Figure 8:
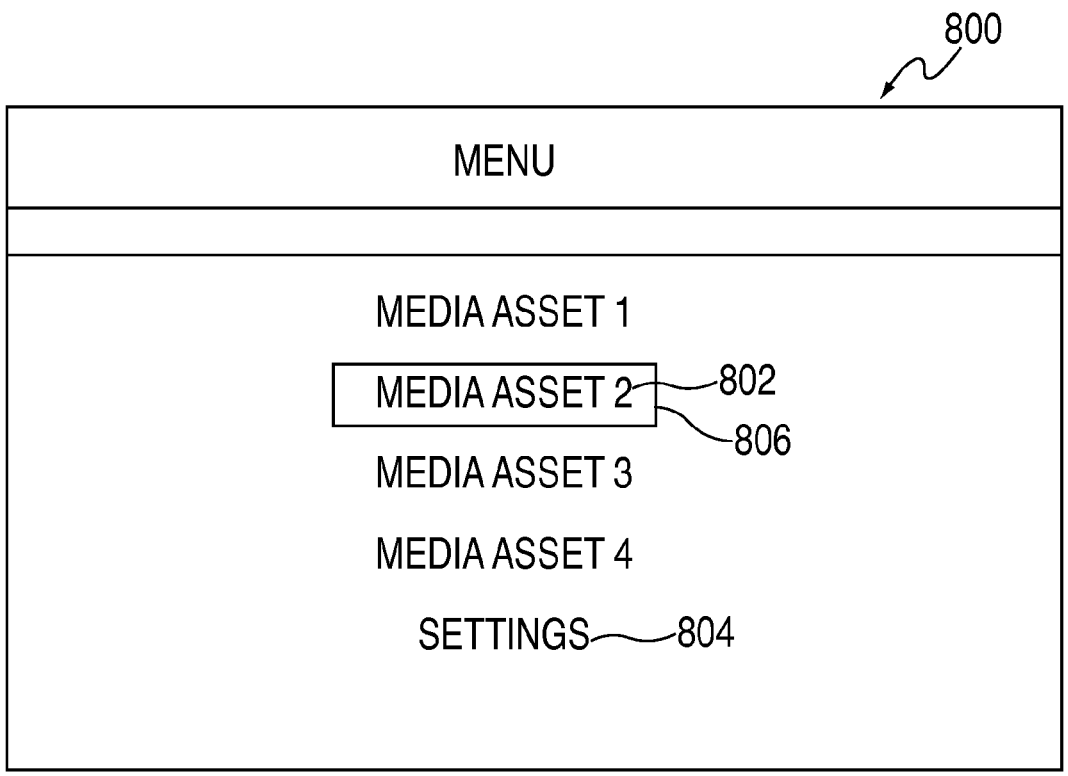
FIGS. 8-13 are simplified illustrative interfaces in accordance with embodiments of the invention.

FIG. 8, for example, shows a display 800, which may include a list of selectable options such as Media Asset 2 option 802 and Settings option 804, according to some embodiments of the invention. Any other selectable options may be presented in display 800. When presented with display 800 or any other display of the invention, a user can provide inputs to the media device using any suitable approach. For example, a user may use an input component to move a highlight region, such as highlight region 806, over an option on a display to send an instruction to the media device to select the option. A user may select Media Asset 2 option 802 to access the media items that are grouped under media asset 2. For example, media asset 2 could be music, videos, or podcasts. A user may also select Settings option 804 to access the different settings available for the media device.

Figure 9:
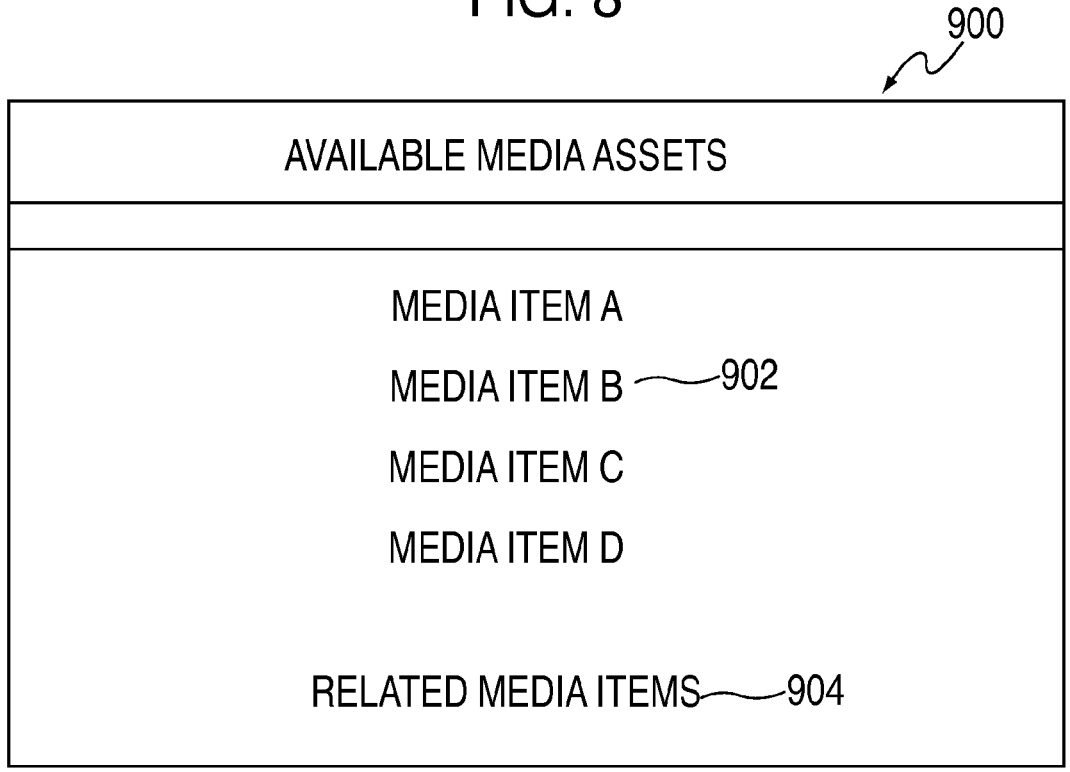

FIG. 9, for example, shows a display 900, which may be presented to a user in response to receiving a user selection of a media asset option (e.g., Media Asset 2 option 802, FIG. 8) according to some embodiments of the invention. Display 900 may include a list of selectable options such as Media Item B and Related Media Items option 904. Any other selectable options may be presented in display 900. The selectable options may include media items that are grouped under a media asset. For example, the selectable options may include a list of audio, video, text, graphics, and/or multimedia item files.

A user may select Media Item B option 902 to access media item B. In response to receiving a user selection of Media Item B option 902, the media device may present media item B to the user using any suitable process. For example, process 500 as shown in FIG. 5 may be executed. The media device may present media item B to the user by, for example, playing media item B or allowing the user to view media item B.

Figure 10:
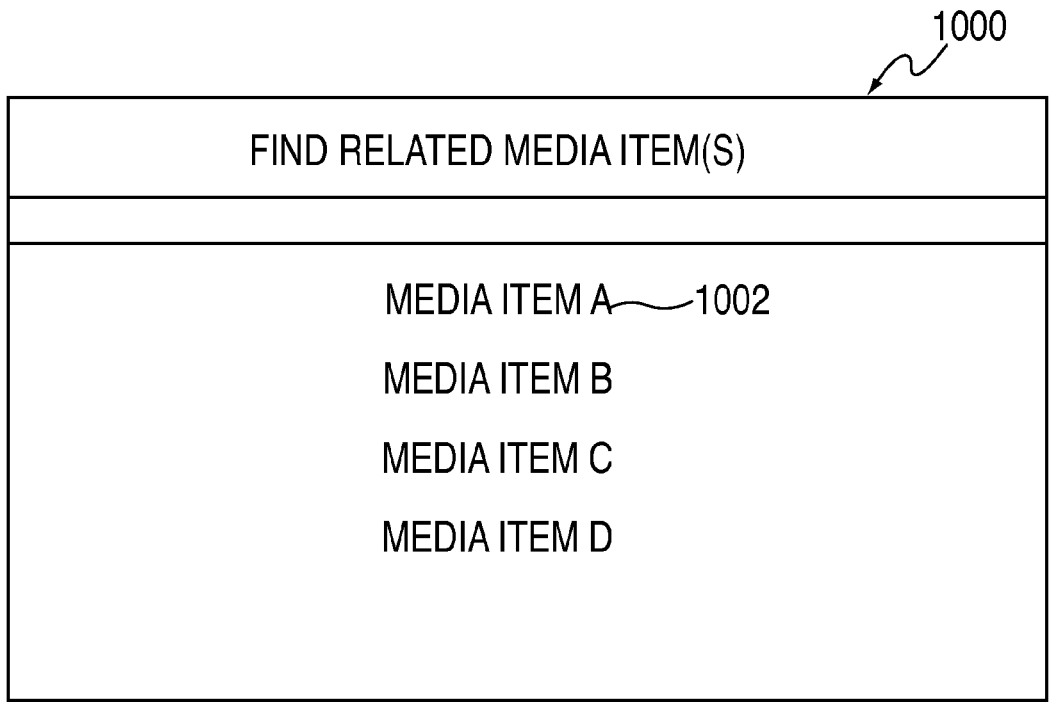

A user may also select Related Media Items option 904 to access media items that are related to any of the media items options listed in display 900. For example, FIG. 10 shows a display 1000, which may be presented to a user in response to receiving a user selection of a related media items option, (e.g., Related Media Items option 904, FIG. 9), according to some embodiments of the invention. As shown in FIG. 10, display 1000 shows a list of selectable options including Media Item A option 1002. The selectable options may include a list of selectable media item options previously presented to the user (e.g., the selectable media item options from display 900). A user may select Media Item A option 1002 from display 1000 to access other media items that are related to media item A. In response to a user selection of Media Item A option 1002, any suitable process may be executed to retrieve media items that are related to media item A from a media store, and to present the one or more related media items to the user. For example, process 700 as shown in FIG. 7 may be executed.

Figure 11:
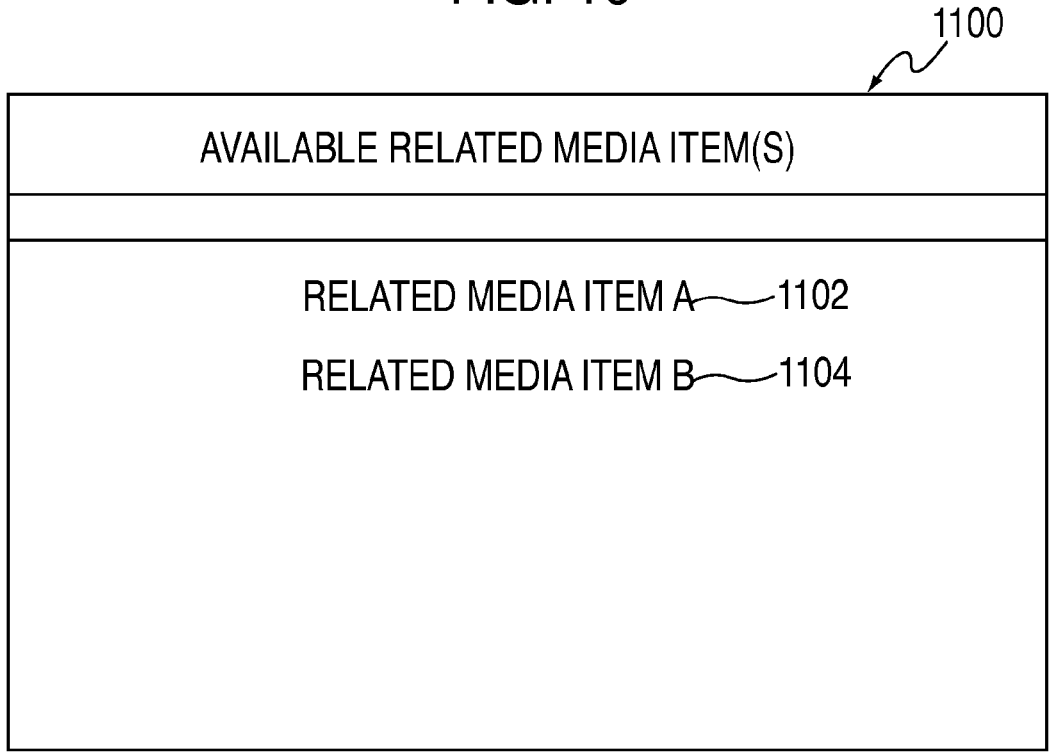

FIG. 11, for example, shows a display 1100, which may be presented to a user in response to receiving a user selection of a media item option from a related media items display according to some embodiments of the invention. For example, FIG. 11 may be presented to a user in response to a user selection of Media Item A option 1002 as shown in FIG. 10. Display 1100 may include a list of selectable related media items options. For example, display 1100 shows Related Media Item option A 1102 and Related Media Item option B 1104. Any suitable number of related media item options may be displayed. For example, if no related media items were found in response to receiving a user request for related media items, display 1100 may be presented with no related media item options. In response to a user selection of Related Media Item option A 1102 or Related Media Item option B 1104, any suitable process may be performed. For example, steps 730 through 760 of process 700 as shown in FIGS. 7A-7C may be performed.

Figure 12:
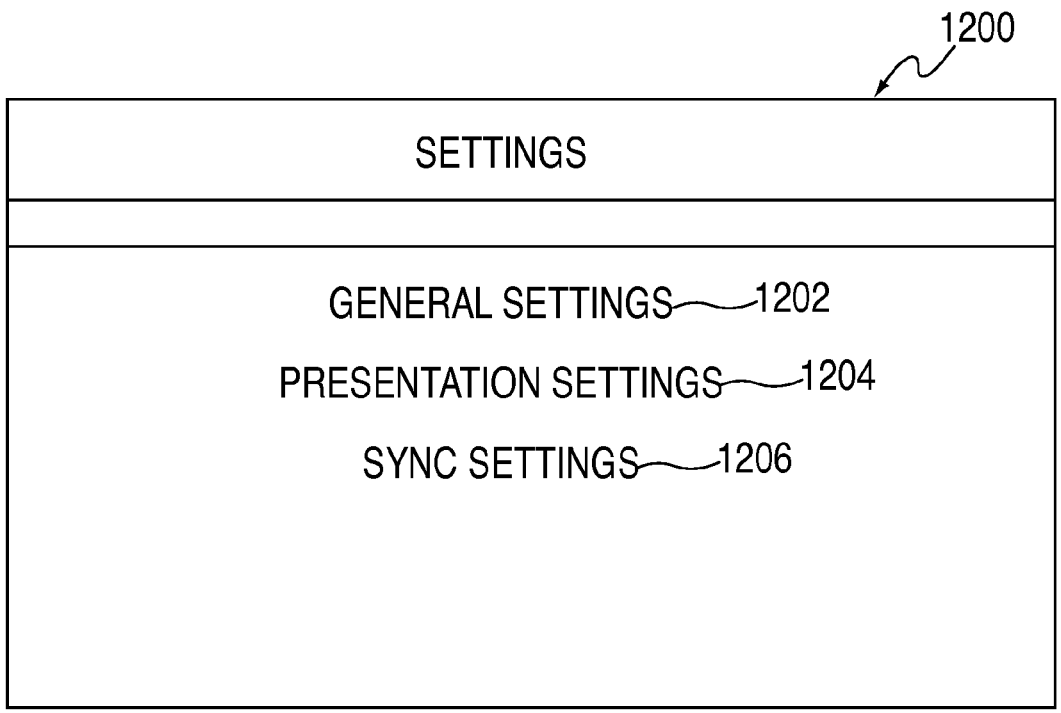

FIG. 12, for example, shows a display 1200, which may be presented to a user in response to receiving a user selection of a settings option, such as Settings option 804 as shown in FIG. 8 according to some embodiments of the invention. Display 1200 shows a list of selectable options, which may include General Settings option 1202, Presentation Settings option 1204, and Synch Settings option 1206.

A user may select General Settings option 1202 to change the factors involved in the general functioning of the media device. As an example, a user may select General Settings option 1202 to specify how the media device should be activated or deactivated. As another example, a user may select General Settings option 1202 to specify how information should be displayed to the user by the media device.

A user may select Presentation Settings option 1204 to set the different parameters involved in the presentation of media items by the media device. For example, a user may select Presentation Settings option 1204 to change how the media device plays media items. As another example, a user may select Presentation Settings option 1204 to specify how the media device should present media items that only have metadata saved on the media device.

Figure 13:
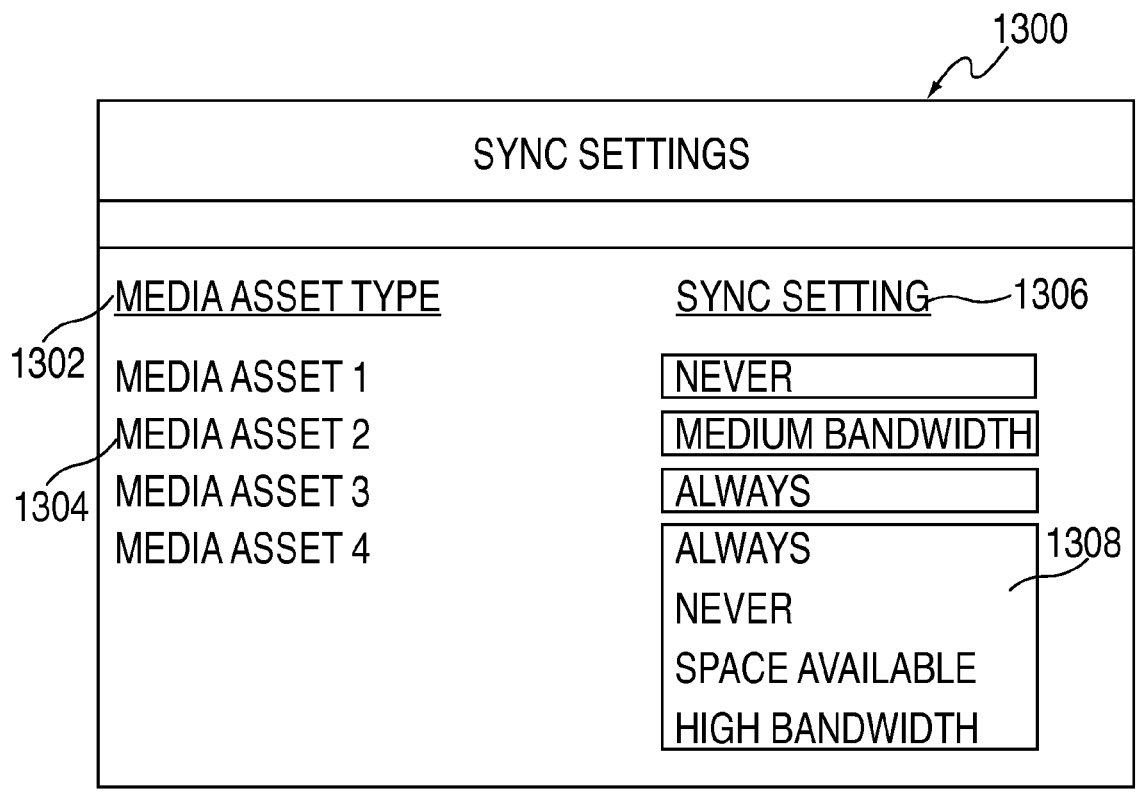

A user may select Synch Settings option 1206 to change the different factors involved in how synchronization is performed by the media device. For example, FIG. 13 shows a display 1300 which may be presented to a user in response to a user selection of a synchronization settings option (e.g., Synch Settings option 1206 of FIG. 12) according to some embodiments of the invention. Display 1300 shows media asset type column 1302, which may include a list of media assets. For example, media asset type column 1302 can include Media Asset 2 option 1304.

Display 1300 can also include Synch Setting column 1306, which may include the synchronization policies to be applied to the media assets listed in media asset type column 1302. A user may select a synchronization policy to be applied to a media asset type using any suitable mechanism. In FIG. 13, display 1300 can include drop down menu 1308, that may list selectable synchronization policies. For example, the available synchronization policies may include Always, Never, Space Available, and High Bandwidth.

Selecting the Always synchronization policy for a media asset may indicate that the media items associated with the media asset will always be synchronized when the media device is connected to another device. Conversely, choosing the Never synchronization policy for a media asset may specify that the media items associated with the media asset will never be synchronized. Selecting the Space Available synchronization policy for a media asset may indicate a policy to synchronize the media asset type if the recipient device has adequate storage space to save the media items associated with the media asset. A High Bandwidth synchronization policy for a media asset may specify that the media items associated with the media asset will be synchronized if high bandwidth network connectivity is available for synchronization.

The processes discussed above are intended to be illustrative and not limiting. Persons skilled in the art will appreciate that steps of the processes discussed herein may be omitted, modified, combined, and/or rearranged, and any additional steps can be performed without departing from the scope of the invention.

The above described embodiments of the invention are presented for purposes of illustration and not of limitation, and the invention is limited only by the claims which follow.

What is claimed is:

1. A method for providing and utilizing a pre-populated media device, comprising:
   authorizing, at a media server, a user account associated with a user;
   receiving at the media storage server:
   a selection of a previously-obtained media item by the user, wherein the media item comprises a content file portion and a metadata portion, wherein the metadata portion is separate from the content file portion, the metadata portion of the media item includes authorization information indicating that the user is authorized to download the media item identified in the media item request by virtue of previously obtaining the right to download the media item, and wherein the metadata portion includes static metadata that is descriptive of the media item and dynamic metadata that is configured to cause the media device to execute actions relating to the media item; and
   a selection of a media device for purchase by the user;
   storing a the metadata portion associated with the previously-obtained media item onto the media device instead of both the metadata portion and the content file portion prior to delivering the media device to the user;
   receiving, after delivering the media device to the user:
   authentication information indicating that the recipient of the delivered media device is associated with the user account; and
   a media item request from the media device, wherein the media item request is associated with the metadata file portion stored on the media device;
   in response to the receiving the media item request, accessing the authorization information that is stored in the metadata file portion; and
   in response to the accessing, synchronizing a content file portion of the media item associated with the metadata file portion to the media device from the media storage server.

2. The method of claim 1, wherein synchronizing the media item comprises automatically accessing, with the media device, the media item from the media storage server without any user interaction.

3. The method of claim 1, wherein synchronizing the media item comprises:

establishing a connection between the media device and the media storage server; and transferring the media item from a media store to the media device using the media storage server.

4. The method of claim 3, wherein synchronizing the media item further comprises receiving a payment from a user before transferring the media item from the media store to the media device.

5. The method of claim 1, wherein synchronizing the media item comprises:

updating information stored in the metadata portion of the media item; and closing a connection between the media device and the media storage server.

6. A method comprising:

authorizing, at a media server, a user account associated with a user;

receiving at the media storage server:
  a selection of a previously-obtained media item by the user, wherein the media item comprises a content file portion and a metadata portion, wherein the metadata portion is separate from the content file portion, the metadata portion of the media item includes authorization information indicating that the user is authorized to download the media item identified in the media item request by virtue of previously obtaining the right to download the media item, and wherein the metadata portion includes static metadata that is descriptive of the media item and dynamic metadata that is configured to cause the media device to execute actions relating to the media item; and
  a selection of a media device for purchase by the user;

storing a the metadata portion associated with the previously-obtained media item onto the media device instead of both the metadata portion and the content file portion prior to delivering the media device to the user;

receiving, after delivering the media device to the user:
  authentication information indicating that the recipient of the delivered media device is associated with the user account; and
  a synchronization request with the media device, wherein the synchronization request is associated with a metadata file portion stored on the media device;

in response to the receiving, accessing the authorization information and copying the metadata file portion from the media device to a client device coupled to the media device.

7. The method of claim 6, wherein the copying the metadata file portion of the media item from the media device to the client device is performed only after determining with the media device that the metadata file is not already stored on the client device.

8. The method of claim 6, wherein the copying the metadata file portion of the media item from the media device to the client device further comprises copying metadata corresponding to the metadata file portion of the media item from the media device to the client device.

9. The method of claim 8, further comprising, after the copying, updating the copied metadata corresponding to the copied metadata file portion of the media item on the client device.

10. The method of claim 9, further comprising:

removing the metadata corresponding to the metadata file portion of the media item from the media device; and copying the updated copied metadata from the client device to the media device.

* * * * *